(12) United States Patent
Iida et al.

(10) Patent No.: US 9,505,369 B2
(45) Date of Patent: Nov. 29, 2016

(54) SIDE AIRBAG APPARATUS

(71) Applicant: TOYODA GOSEI CO., LTD., Kiyosu-shi, Aichi-ken (JP)

(72) Inventors: Takashi Iida, Kiyosu (JP); Norihisa Taya, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/844,084

(22) Filed: Sep. 3, 2015

(65) Prior Publication Data
US 2016/0075303 A1   Mar. 17, 2016

(30) Foreign Application Priority Data

Sep. 12, 2014 (JP) ................................ 2014-186322
Feb. 25, 2015 (JP) ................................ 2015-035392

(51) Int. Cl.
*B60R 21/233*    (2006.01)
*B60R 21/2338*   (2011.01)
*B60R 21/231*    (2011.01)
(Continued)

(52) U.S. Cl.
CPC ....... *B60R 21/23138* (2013.01); *B60R 21/207* (2013.01); *B60R 21/233* (2013.01); *B60R 21/239* (2013.01); *B60R 21/2338* (2013.01); *B60R 2021/2395* (2013.01); *B60R 2021/23146* (2013.01); *B60R 2021/23308* (2013.01); *B60R 2021/23324* (2013.01); *B60R 2021/23382* (2013.01)

(58) Field of Classification Search
CPC .......... B60R 21/23138; B60R 21/233; B60R 21/207; B60R 21/2338; B60R 21/2334; B60R 21/231; B60R 2021/23146; B60R 2021/23324; B60R 21/23308; B60R 2021/23382; B60R 2021/0006
USPC ........................ 280/729, 730.2, 743.1, 743.2
See application file for complete search history.

(56) References Cited

U.S. PATENT DOCUMENTS

| | | | |
|---|---|---|---|
| 8,616,579 B2 * | 12/2013 | Suzuki | B60R 21/23138 280/729 |
| 8,657,330 B1 * | 2/2014 | Choi | B60R 21/233 280/730.2 |
| 9,254,811 B2 * | 2/2016 | Hayashi | B60R 21/231 |

(Continued)

FOREIGN PATENT DOCUMENTS

| | | |
|---|---|---|
| JP | 2006-224817 A | 8/2006 |
| JP | 2007-197008 A | 8/2007 |

(Continued)

*Primary Examiner* — Keith Frisby
(74) *Attorney, Agent, or Firm* — Posz Law Group, PLC

(57) ABSTRACT

A lateral partition divides the interior of an airbag main body into an upper inflation chamber including a first section and a lower inflation chamber including a second section. The upper inflation chamber is located above the second section of the lower inflation chamber. An upper restricting portion is provided in a bridging manner in the first section. The upper restricting portion has a front-rear length that is shorter than a circumferential length in a front-rear direction of the first section. The upper restricting portion is tensioned in the front-rear direction when the upper inflation chamber is inflated. The upper restricting portion restricts an inflated dimension in the front-rear direction of the upper inflation chamber such that an inflated dimension of the first section in a lateral direction of the automobile is greater than an inflated dimension of the lower inflation chamber in the lateral direction.

8 Claims, 15 Drawing Sheets

(51) Int. Cl.
*B60R 21/207* (2006.01)
*B60R 21/239* (2006.01)

(56) References Cited

U.S. PATENT DOCUMENTS

| | | |
|---|---|---|
| 2003/0168836 A1 | 9/2003 | Sato et al. |
| 2007/0216142 A1* | 9/2007 | Honda ................ B60R 21/207 |
| | | 280/730.2 |
| 2012/0126518 A1* | 5/2012 | Fukawatase .......... B60R 21/207 |
| | | 280/730.2 |
| 2016/0200280 A1* | 7/2016 | Fujiwara ........... B60R 21/23138 |
| | | 280/729 |

FOREIGN PATENT DOCUMENTS

| | | | |
|---|---|---|---|
| JP | 4556817 B2 * | 10/2010 | |
| JP | 2011-126497 A | 6/2011 | |
| JP | 2014-156233 A * | 8/2014 | ........... B60R 21/233 |

* cited by examiner

[First Step]

Fig. 12
[Second Step]
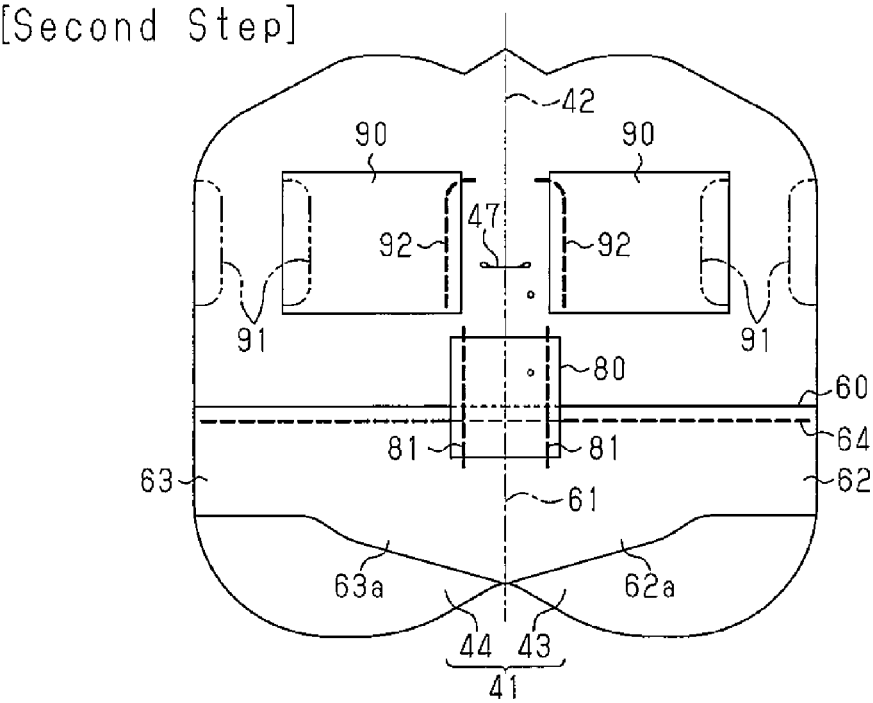
Fig. 13A
[Third Step]
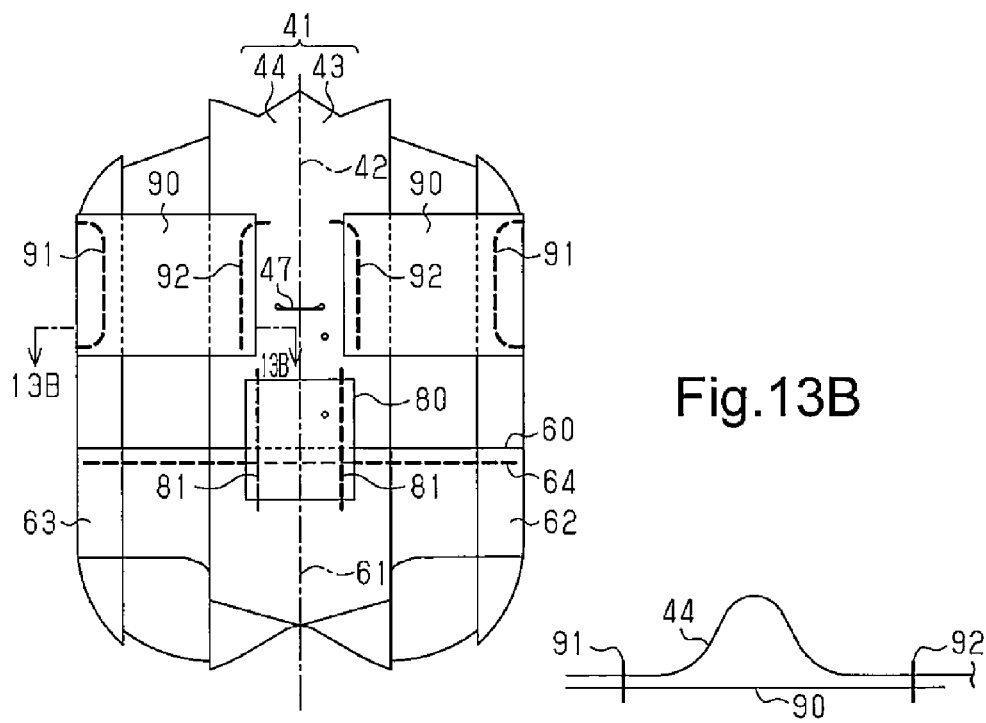
Fig. 13B

[Fourth Step]

[Fourth Step]

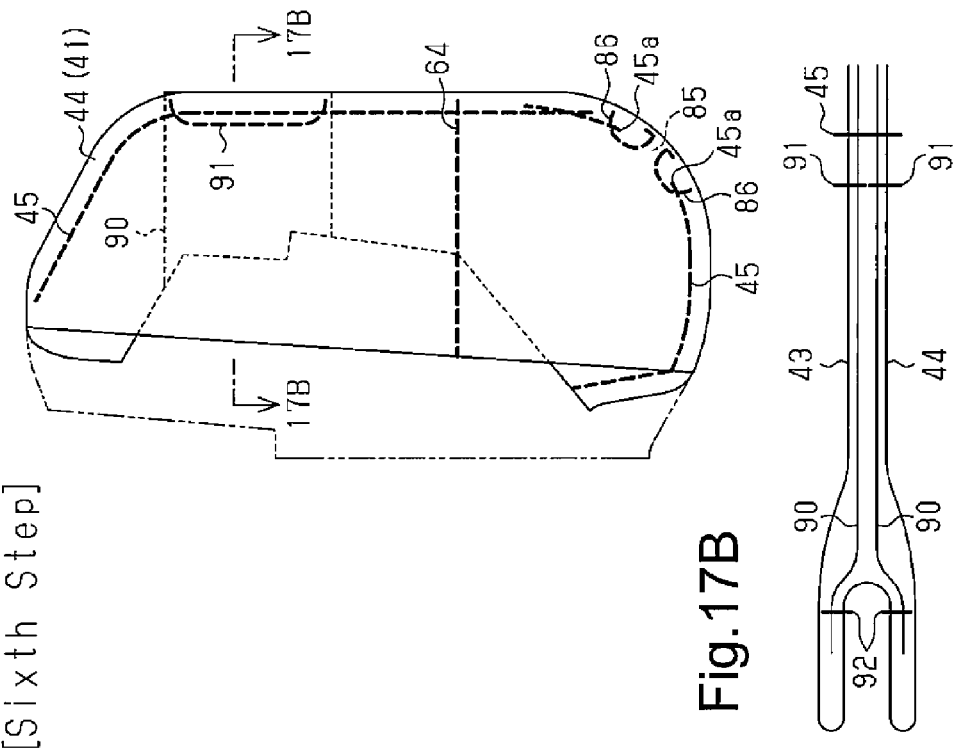
Fig.17A [Sixth Step]
Fig.17B
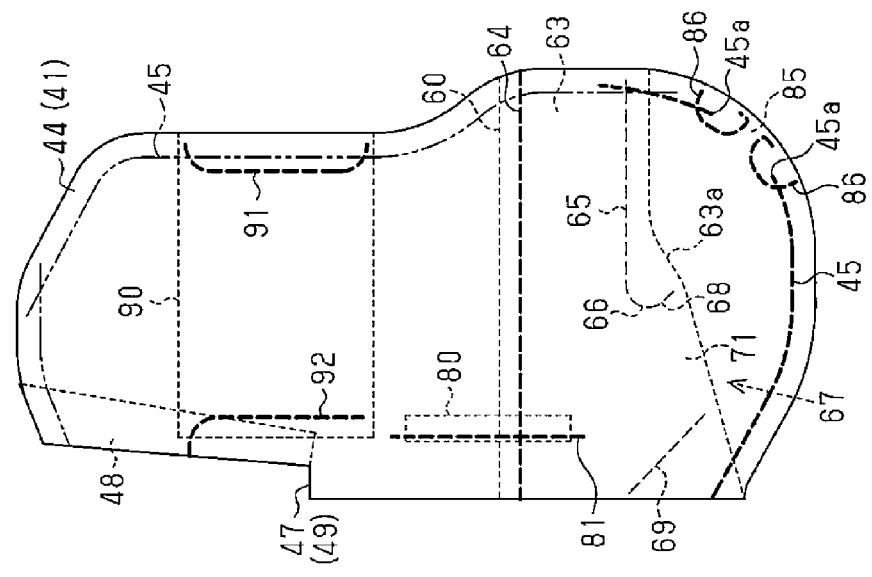
Fig.16 [Fifth Step]

Fig.18A
[Seventh Step]
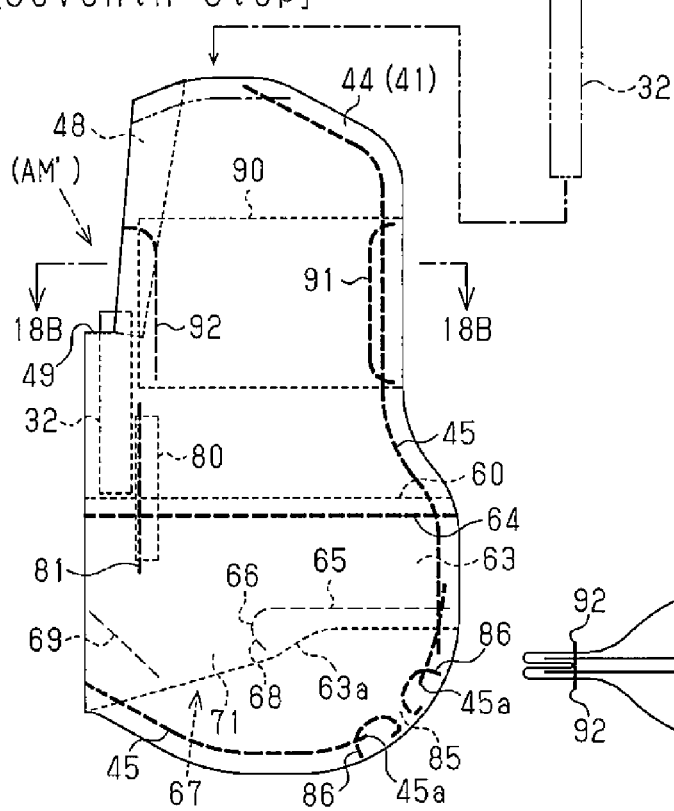
Fig.18B
Fig.19A
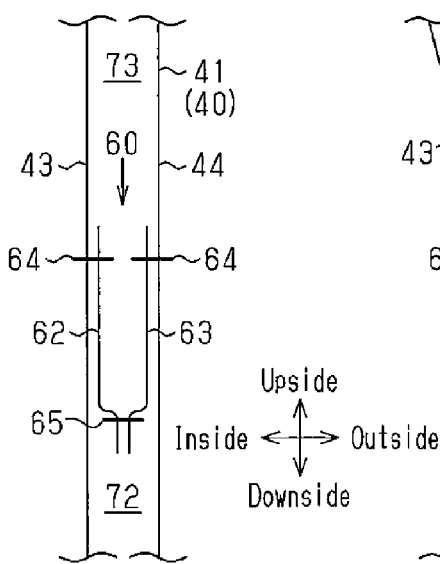
Fig.19B
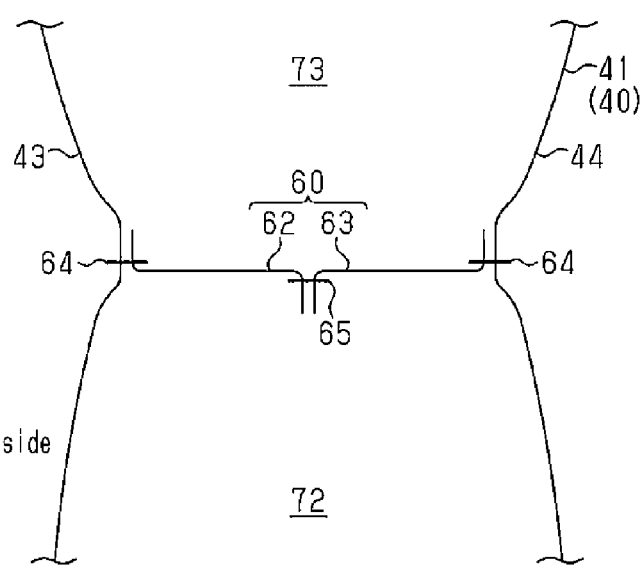

SIDE AIRBAG APPARATUS

BACKGROUND OF THE DISCLOSURE

The present invention relates to a side airbag apparatus that protects an occupant seated in a vehicle seat from an impact by deploying and inflating an airbag on a side of the occupant when the impact is applied to the vehicle.

A side airbag apparatus having an airbag and an inflator is effective as an apparatus that protects an occupant seated in an automobile seat when an impact is applied to the seat from a side, for example, due to a side collision. One known form of the side airbag apparatus includes an airbag having an airbag main body, which forms the outer envelope, and a lateral partition, which is provided in the airbag main body in a bridging manner (for example, Japanese Laid-Open Patent Publication 2011-126497). The lateral partition of this side airbag apparatus divides the interior of the airbag main body into an upper inflation chamber above the lateral partition and a lower inflation chamber below the lateral partition.

When an impact is applied from the side to a body side portion of the automobile, for example, to a side door, the inflator supplies inflation gas to the upper inflation chamber and the lower inflation chamber. At this time, the amount of the inflation gas supplied to the lower inflation chamber is greater than the amount of the inflation gas supplied to the upper inflation chamber. The upper inflation chamber is deployed and inflated between a part of the occupant's body above the lumbar region and the inwardly bulging body side portion. The lower inflation chamber is deployed and inflated between the occupant's lumbar region and the body side portion with an internal pressure higher than that of the upper inflation chamber. Thus, the lumbar region, which has a higher impact resistance than the thorax region, is pushed by the lower inflation chamber, which is inflated with a high internal pressure. Also, the thorax region, which has a lower impact resistance than the lumbar region, is pushed by the upper inflation chamber, which is inflated with a lower internal pressure than that of the lower inflation chamber. As a result, the lumbar region and the thorax region are respectively restrained by the lower inflation chamber and the upper inflation chamber, which are inflated with a pressure distribution appropriate for the impact resistances of these regions, and the impact transmitted from the side to the occupant through the body side portion is reduced.

To protect an occupant from an impact with a side airbag apparatus, it is important that the amount of energy absorbed by the airbag be great. To that end, it is effective to increase the internal pressure of the upper inflation chamber and the lower inflation chamber and to inflate the inflation chambers largely in the widthwise direction of the automobile seat, that is, to increase the inflated dimension of each inflation chamber in the widthwise direction of the automobile seat.

In this regard, the side airbag apparatus of the above described document deploys and inflates the lower inflation chamber with a higher internal pressure than that of the upper inflation chamber. This allows the lower inflation chamber to absorb a sufficient amount of energy to effectively protect the lumbar region from an impact. However, since the upper inflation chamber is deployed and inflated with a lower internal pressure than that of the lower inflation chamber, the upper inflation chamber cannot easily exert the same effect as the lower inflation chamber. Further, the inflated dimension of the upper inflation chamber in the widthwise direction of the automobile seat is restricted by the lateral partition. Thus, there is still room for improvement in increase in the energy absorption amount of the upper inflation chamber to improve the protection performance for the thorax region.

SUMMARY OF THE INVENTION

Accordingly, it is an objective of the present invention to provide a side airbag apparatus that further improves the protection performance for the thorax region of an occupant.

To achieve the foregoing objective and in accordance with one aspect of the present invention, a side airbag apparatus includes an airbag main body, which is deployed and inflated beside an occupant seated in a vehicle seat to restrain the occupant, an inflator, which supplies inflation gas to the airbag main body in response to an impact applied to the vehicle seat from a side, and a lateral partition, which is provided in the airbag main body in a bridging manner to divide at least a part of an interior of the airbag main body into an upper inflation chamber above the lateral partition and a lower inflation chamber below the lateral partition. The upper inflation chamber includes a first section, and the lower inflation chamber includes a second section. A sheet-like upper restricting portion is provided in a bridging manner in the first section of the upper inflation chamber, wherein the upper restricting portion restricts an inflated dimension of the upper inflation chamber. The upper inflation chamber is located above the second section of the lower inflation chamber, and the lower inflation chamber is inflated with an internal pressure higher than that of the upper inflation chamber. The upper restricting portion has a front-rear length that is shorter than a circumferential length in a front-rear direction of the first section of the upper inflation chamber and is tensioned in the front-rear direction as the upper inflation chamber is inflated. The upper restricting portion is configured to restrict an inflated dimension of the upper inflation chamber in the front-rear direction such that, when inflation of the airbag main body is completed, an inflated dimension of the first section of the upper inflation chamber in a widthwise direction of the vehicle seat is greater than an inflated dimension of the lower inflation chamber in the widthwise direction of the vehicle seat.

The first section of the upper inflation chamber corresponds to a section that is inflated beside at least a part of the thorax region of the occupant, and the second section of the lower inflation chamber corresponds to a section that is inflated beside the lumbar region of the occupant. With the above configuration, when an impact is applied to the vehicle from the side of the vehicle seat, the inflator supplies inflation gas to the upper inflation chamber and the lower inflation chamber. With above configuration, the upper inflation chamber is deployed and inflated beside a part that is above the lumbar region of the occupant and includes the thorax region, and the lower inflation chamber is deployed and inflated beside the lumbar region with an internal pressure that is higher than that of the upper inflation chamber.

Thus, the lumbar region, which has a higher impact resistance than the thorax region, is pushed by the lower inflation chamber, which is inflated with a high internal pressure. Also, the thorax region, which has a lower impact resistance than the lumbar region, is pushed by the upper inflation chamber, which is inflated with a lower internal pressure than that of the lower inflation chamber. As a result, the lumbar region and the thorax region are respectively restrained by the lower inflation chamber and the upper inflation chamber, which are inflated with a pressure distribution appropriate for the impact resistances of these regions, and the impact transmitted from the side to the occupant is reduced.

The inflated dimension of the upper inflation chamber in the widthwise direction of the vehicle seat is restricted by the lateral partition. However, as the upper inflation chamber is deployed and inflated, the upper restricting portion is tensioned in the front-rear direction beside at least a part of the thorax region of the occupant. The front-rear length of the upper restricting portion is shorter than the circumferential length in the front-rear direction of a section of the upper inflation chamber that is inflated beside at least a part of the thorax region, that is, in the front-rear direction of the first section of the upper inflation chamber. Thus, the inflated dimension in the front-rear direction of the upper inflation chamber is restricted by the upper restricting portion. The upper inflation chamber acts to be inflated in the widthwise direction of the vehicle seat, in which the inflated dimension is not restricted by the upper restricting portion. When the inflation of the airbag main body is completed, the inflated dimension of the first section of the upper inflation chamber in the widthwise direction of the vehicle seat is greater than the inflated dimension of the lower inflation chamber in the widthwise direction of the vehicle seat.

Therefore, although the first section of the upper inflation chamber is inflated and deployed with a lower internal pressure than that of the lower inflation chamber, the first section is largely inflated in the widthwise direction of the vehicle seat. That is, the increase in the inflated dimension in the widthwise direction of the first section of the upper inflation chamber increases the amount of energy absorbed by the first section of the upper inflation chamber. This improves the protection performance for the thorax region.

BRIEF DESCRIPTION OF THE DRAWINGS

FIG. 12 is an explanatory diagram showing a second step in the procedure for a module preassembly according to the first embodiment;

FIG. 13A is an explanatory diagram showing a third step in the procedure for a module preassembly according to the first embodiment;

FIG. 13B is a cross-sectional view taken along line 13B-13B of FIG. 13A;

FIG. 16 is an explanatory diagram showing a fifth step in the procedure for a module preassembly according to the first embodiment;

FIG. 17A is an explanatory diagram showing a sixth step in the procedure for a module preassembly according to the first embodiment;

FIG. 17B is a cross-sectional view taken along line 17B-17B of FIG. 17A;

FIG. 18A is an explanatory diagram showing a seventh step in the procedure for a module preassembly according to the first embodiment;

FIG. 18B is a cross-sectional view taken along line 18B-18B of FIG. 18A;

FIG. 19A is a cross-sectional view taken along line 19A-19A in FIG. 5;

FIG. 19B is a partial cross-sectional view showing the internal structure of the airbag lower portion when a lateral partition of FIG. 19A is tensioned;

DETAILED DESCRIPTION OF THE PREFERRED EMBODIMENTS

First Embodiment

An automobile side airbag apparatus according to a first embodiment of the present invention will now be described with reference to FIGS. 1 to 21.

In the following, the direction in which the automobile advances forward will be referred to as the front, and reverse direction will be referred to as the rear. The middle of the lateral direction of the automobile is used as reference in the lateral direction of the automobile. A side closer to the middle of the lateral direction will be referred to as "inner side" of the automobile, while a side farther from the middle of the lateral direction will be referred to "outer side" of the automobile. Further, it is provided that an average sized occupant is seated on an automobile seat in a predetermined normal posture.

Figure 1:
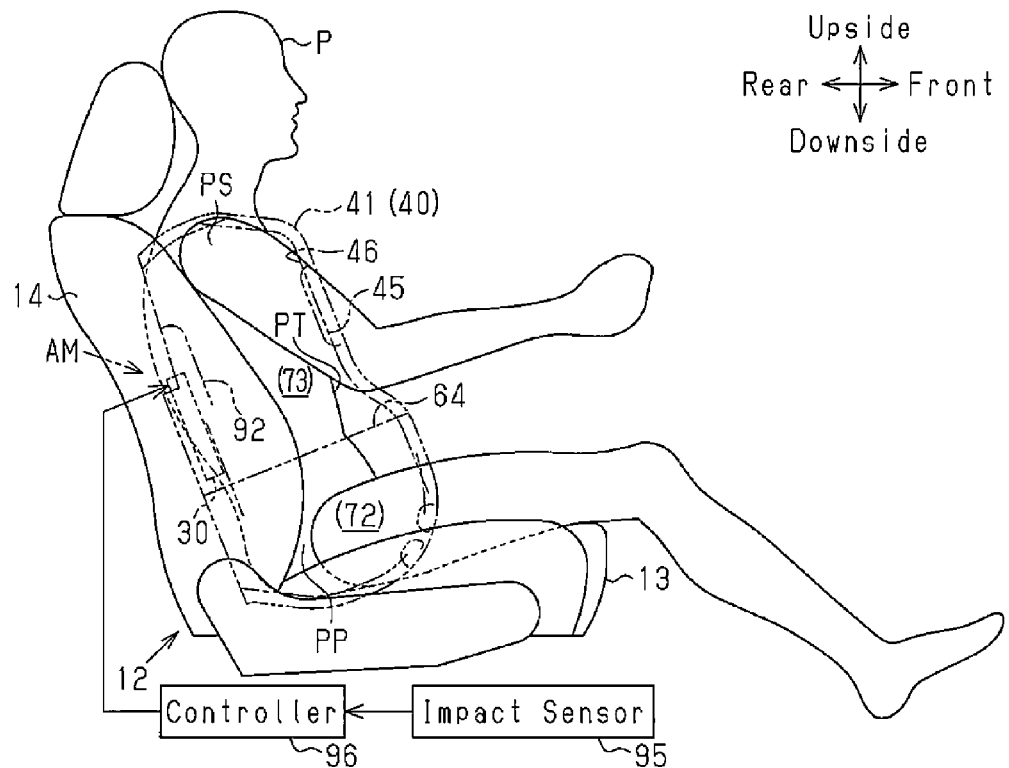
FIG. 1 is a side view of an automobile side airbag apparatus according to a first embodiment, illustrating, together with an occupant, an automobile seat in which the apparatus is installed.
Figure 2:
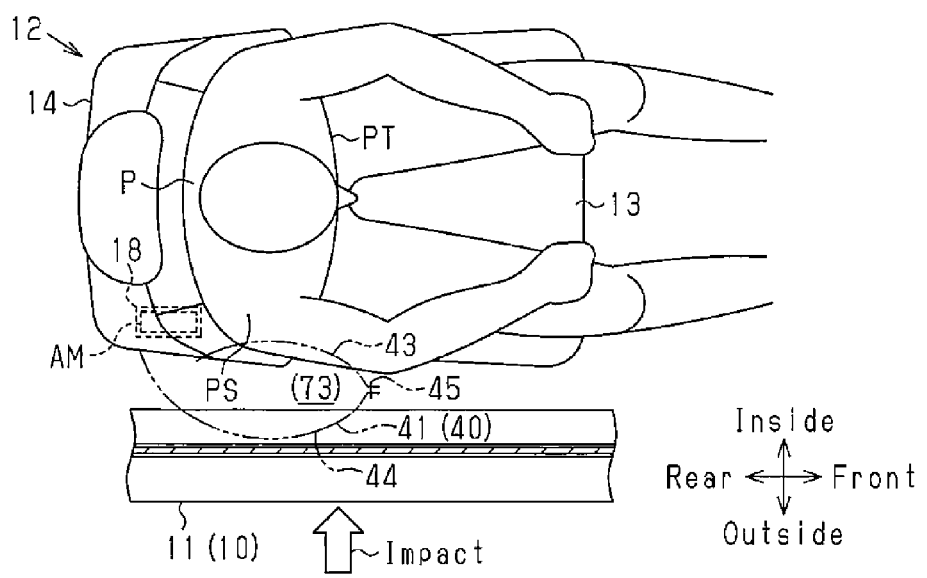
FIG. 2 is a cross-sectional plan view of the positional relationship of the automobile seat, an airbag, the occupant, and a body side portion according to the first embodiment.
Figure 3:
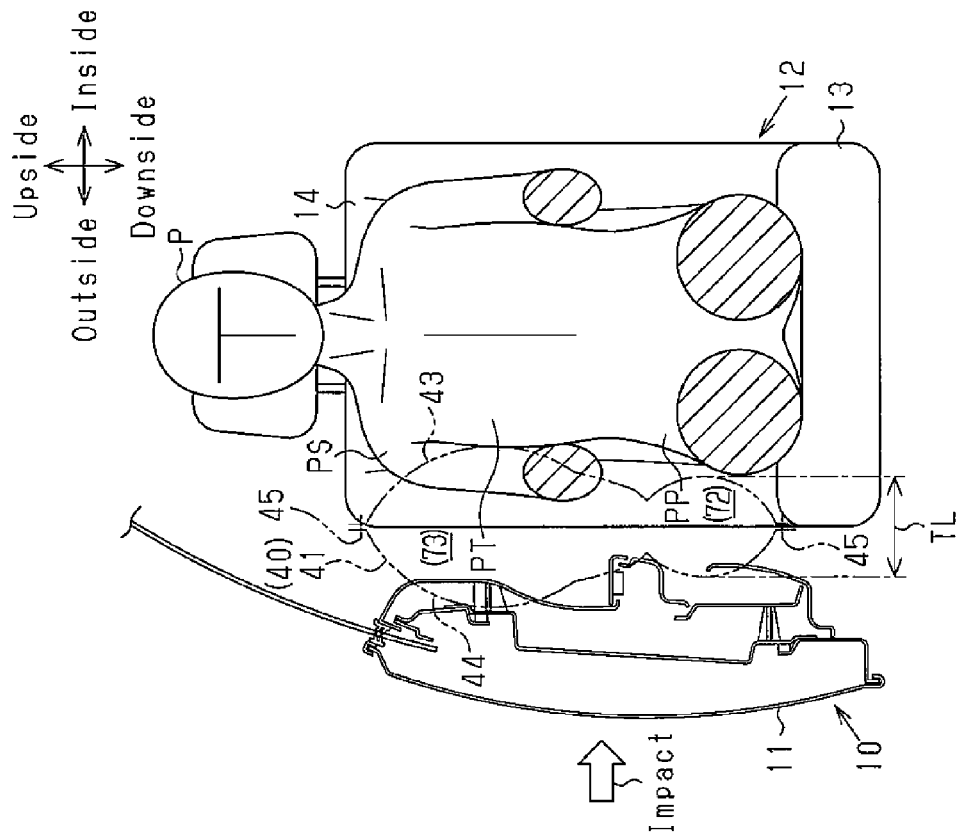
FIG. 3 is a cross-sectional front view of the positional relationship of the automobile seat, the airbag, the occupant, and the body side portion in the first embodiment.

As shown in FIGS. 1 to 3, a vehicle seat, which is an automobile seat 12 in this embodiment, is arranged on the inner side of a body side portion 11 of an automobile 10. The body side portion 11 refers to an automobile component that is located at a side of the automobile 10, and mainly corresponds to doors and pillars. For example, part of the body side portion 11 corresponding to the front seat includes a front door and a center pillar (B-pillar). Part of the body side portion 11 corresponding to the rear seat includes a rear part of the side door (rear door), a C-pillar, a front part of the wheel well, and the rear quarter.

The automobile seat 12 includes a seat cushion 13 and a seat back 14, which extends upward from the rear end of the seat cushion 13. The tilt angle of the seat back 14 is adjustable. The automobile seat 12 is arranged in the passenger compartment such that the seat back 14 faces forward. The widthwise direction of the automobile seat 12 thus matches with the lateral direction of the automobile 10.

The internal structure of a side portion of the seat back 14 on the outer side will now be described.

Figure 4:
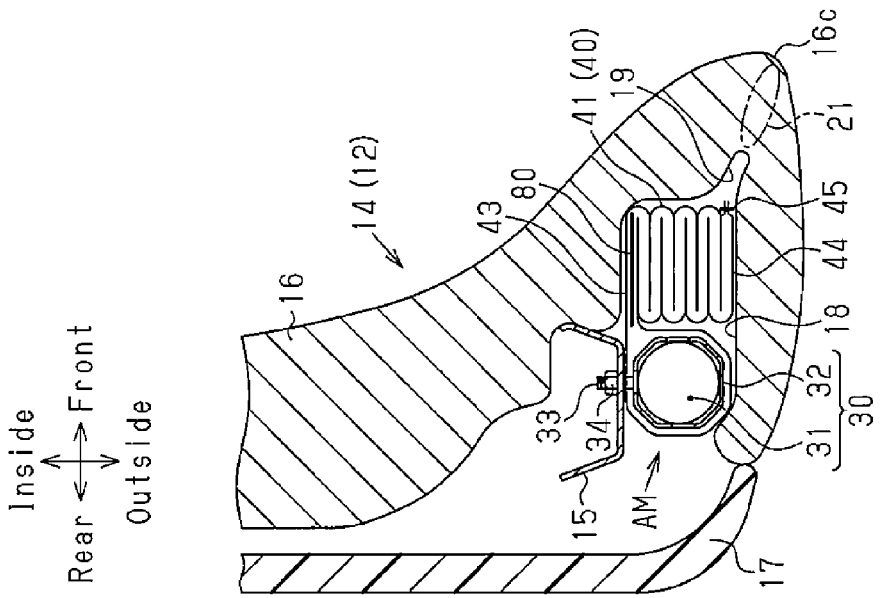
FIG. 4 is a partially cross-sectional plan view showing the internal structure of a side portion of the seat back in which an airbag module of the first embodiment is installed.

The seat back 14 incorporates a seat frame, which forms the framework. A part of the seat frame forms a side frame portion 15, which is located in the outer side portion of the seat back 14 as shown in FIG. 4. The side frame portion 15 is formed by bending a metal plate. A seat pad 16, which is made of an elastic material such as urethane foam, is provided on the front side of the seat frame, which includes the side frame portion 15. Also, a hard back board 17, which is formed, for example, of plastic, is arranged on the back of the seat frame. Although the seat pad 16 is coated with a cover, the cover is not illustrated in FIG. 4. The same applies to FIG. 20, which will be discussed below.

In the seat pad 16, a storage portion 18 is provided in the outer side portion of the side frame portion 15. The storage portion 18 accommodates an airbag module AM, which forms a main part of the side airbag apparatus.

A slit 19 is formed to extend from a corner of the storage portion 18. The slit 19 extends diagonally forward and toward the outer side. An area between a front corner 16c of the seat pad 16 and the slit 19 (an area surrounded by a long dashed double-short dashed line in FIG. 4) forms a breakable portion 21, which is designed to be broken by an airbag 40, which will be discussed below.

The airbag module AM includes as its main components a gas generator 30 and an airbag 40. These components will now be described.

<Gas Generator 30>

Figure 9:
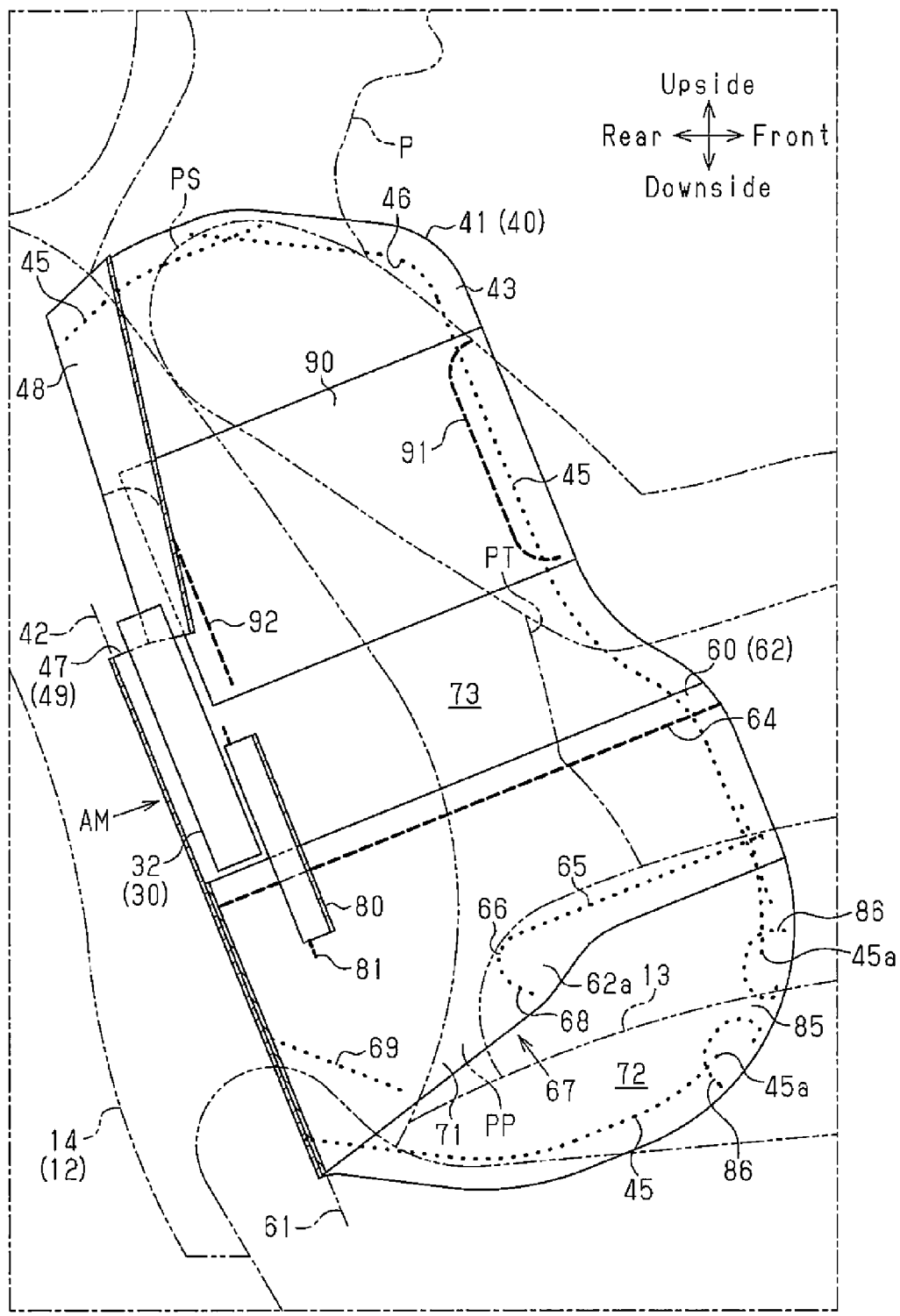
FIG. 9 is a cross-sectional side view illustrating, together with an occupant and an automobile seat, the internal structure of the airbag module of FIG. 5.

As shown in FIGS. 4 and 9, the gas generator 30 includes an inflator 31 and a retainer 32, which surrounds the inflator 31. A pyrotechnic type inflator is employed as the inflator 31. The inflator 31 is substantially columnar and accommodates therein a gas generating agent (not shown), which generates inflation gas. The inflator 31 has a gas outlet (not shown) at the lower end. A harness (not shown) for inputting activation signals to the inflator 31 is connected to the upper end of the inflator 31.

In place of the pyrotechnic inflator using a gas generating agent, it is possible to use a hybrid type inflator as the inflator 31. A hybrid type inflator discharges inflation gas by breaking a partition wall of a high-pressure gas cylinder filled with high-pressure gas with a low explosive.

The retainer 32 functions as a diffuser for controlling the direction of discharged inflation gas and also serves to fasten the inflator 31, together with the airbag 40, to the side frame portion 15. Most of the retainer 32 is formed by bending a plate such as a metal plate into a cylindrical shape. Bolts 33 are fixed to the retainer 32. The bolts 33 serve as securing members for attaching the retainer 32 to the side frame portion 15. The gas generator 30 may be formed by integrating the inflator 31 and the retainer 32.

<Airbag 40>

As shown in FIGS. 1 to 3, the outer envelope of the airbag 40 is formed by an airbag main body 41.

<Airbag Main Body 41>

Figure 5:
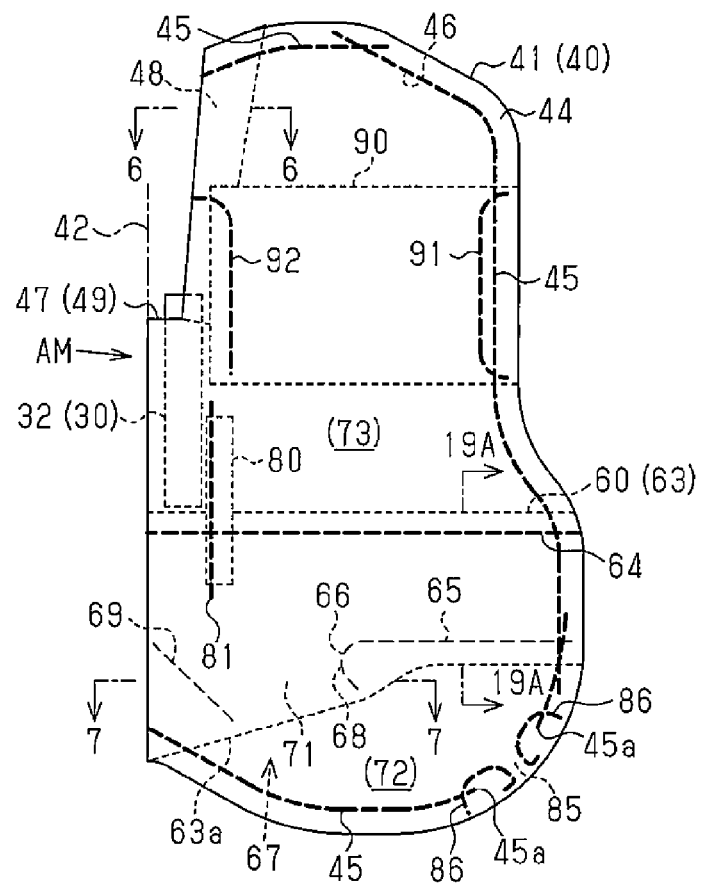
FIG. 5 is a side view illustrating the airbag module with an airbag main body in an uninflated and deployed state in the first embodiment.
Figure 8:
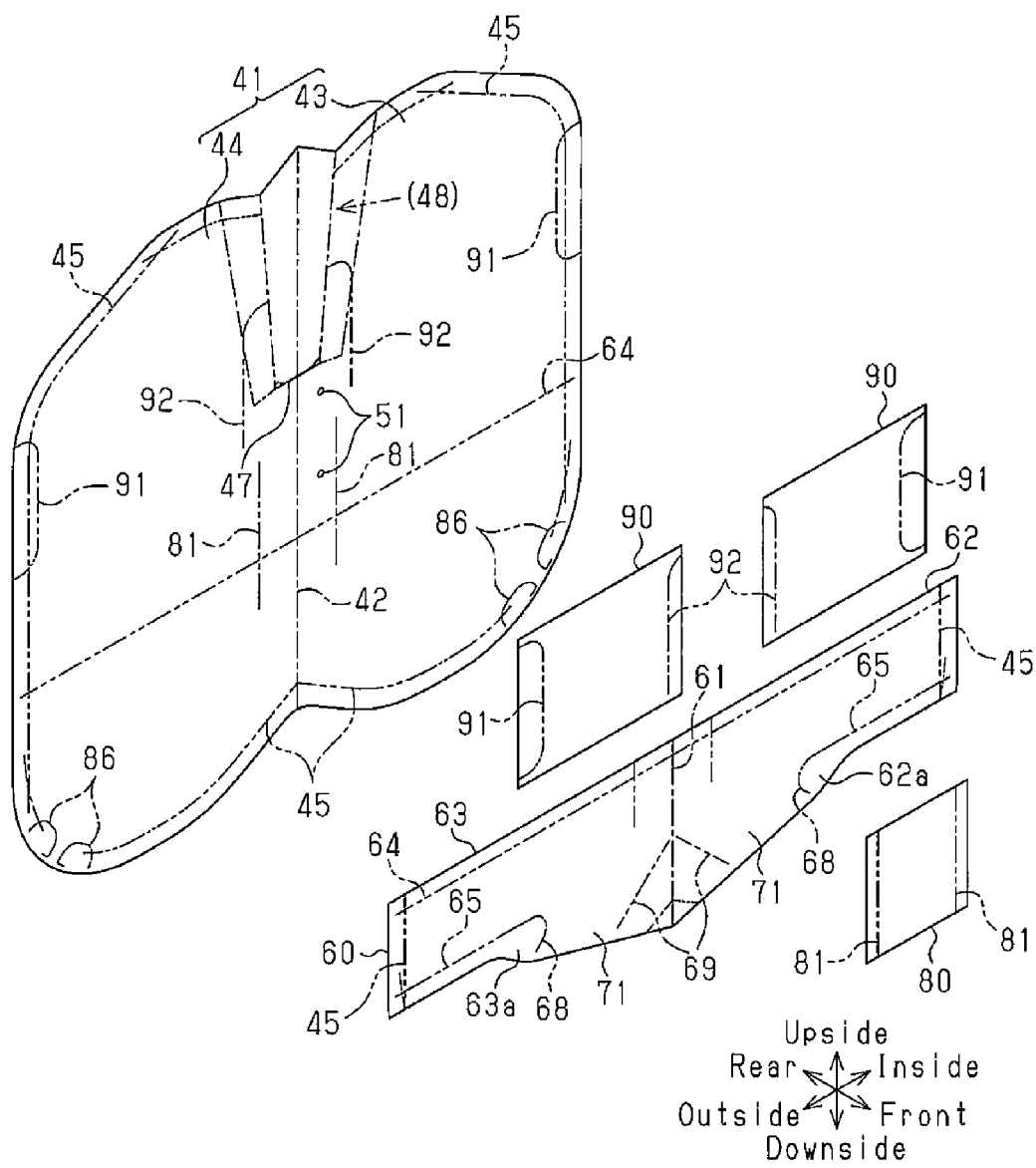
FIG. 8 is an exploded perspective view showing a spread state of the components of the airbag in the first embodiment.

FIG. 5 shows the airbag module AM in a state in which the airbag main body 41 is deployed in a planar form without being filled with inflation gas (hereinafter, referred to as an uninflated and deployed state). FIG. 8 shows the components of the airbag 40 including the airbag main body 41 in a deployed state. FIG. 9 shows, together with the automobile seat 12 and an occupant P, the airbag module AM, in which the airbag main body 41 of FIG. 5 is cut at the center portion of the lateral direction to show the internal structure of the airbag module AM.

As shown in FIGS. 5, 8, and 9, the airbag main body 41 is formed by folding forward a single fabric piece (also referred to as a base fabric or a fabric panel) along a first folding line 42, which is defined at the center, to be overlapped in the lateral direction, and joining the overlapped parts to form a bag shape. To distinguish the two overlapped parts of the airbag main body 41, the part located on the inner side will be referred to as a first main body fabric portion 43, and the part located on the outer side will be referred to as a second main body fabric portion 44.

In the first embodiment, the fabric piece is folded in half such that the first folding line 42 is located at the rear end of the airbag main body 41. However, the fabric piece may be folded in half such that the first folding line 42 is located at another end such as the front end, the upper end, or the lower end. The airbag main body 41 may also be formed of two fabric pieces divided along the first folding line 42. In this case, the airbag main body 41 is formed by overlapping two fabric pieces in the lateral direction, and joining the fabric pieces into a bag shape. At least one of the main body fabric portions 43, 44 may be formed by two or more fabric pieces.

As shown in FIGS. 8 and 9, in the airbag main body 41, the outer shapes of the main body fabric portions 43, 44 are symmetric with respect to the first folding line 42. The shape and the size of the main body fabric portions 43, 44 are set such that the airbag main body 41 occupies the region corresponding to most part of the upper body of the occupant P (the section including the thorax region PT and the lumbar region PP) when the airbag main body 41 is deployed and inflated between the automobile seat 12 and the body side portion 11.

The main body fabric portions 43, 44 are preferably formed of a material having high strength and flexibility to be easily folded. The material may be, for example, woven cloth formed of polyester threads or polyamide threads.

The main body fabric portions 43, 44 are joined together at a peripheral joint portion 45 provided at the peripheral portions. In the first embodiment, most of the peripheral joint portion 45 is formed by sewing with sewing threads a part of the peripheral portions of the main body fabric portions 43, 44 except for the rear end (the part in the vicinity of the first folding line 42). The same structure is applied to first and second lateral joint portions 64, 65, a front joint portion 68, a rear joint portion 69, first to fifth vertical joint portions 81, 91, 92, 111, 112, a surrounding joint portion 86, and first to third side edge joint portions 102 to 104.

The sewn portions are depicted by first to third different broken lines in FIGS. 5 and 9 to 18A. The same applies to FIGS. 22 and 24, which will be used for describing a second embodiment. The same applies to FIG. 27, which will be used for describing a third embodiment. The first broken line includes thick line segments with a certain length arranged intermittently and represents sewing threads as viewed from the side (refer to the peripheral joint portion 45 in FIG. 5). The second broken line includes thin line segments with a certain length (longer than that of a typical broken line) arranged intermittently and represents the state of sewing threads that are located, for example, behind a fabric piece and cannot be seen directly (refer to the second lateral joint portion 65 on the lower side in FIG. 5). The third broken line includes dots arranged at predetermined intervals and represents the cross-section of the sewing threads extending along a plane that passes through the sewn portions (refer to the peripheral joint portion 45 in FIG. 9).

The peripheral joint portion 45 may be formed by a method other than sewing using sewing threads. For example, the peripheral joint portion 45 may be formed by adhesion with an adhesive. The same structure is applied to first and second lateral joint portions 64, 65, a front joint portion 68, a rear joint portion 69, first to fifth vertical joint portions 81, 91, 92, 111, 112, a surrounding joint portion 86, and first to third side edge joint portions 102 to 104.

As shown in FIGS. 5 and 9, the space between the main body fabric portions 43, 44 surrounded by the peripheral joint portion 45 and the first folding line 42 serves as an inflation portion 46, which is deployed and inflated with inflation gas.

Figure 6:
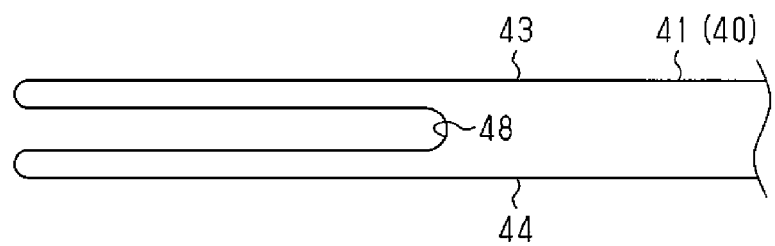
FIG. 6 is a cross-sectional view taken along line 6-6 of FIG. 5.

A slit 47 extending perpendicularly to or substantially perpendicularly to the first folding line 42 is formed at an upper part in the rear end of the folded airbag main body 41 (see FIG. 8). As shown in FIG. 6, a part of the main body fabric portions 43, 44 above the slit 47 is tucked inward of the remaining parts to form an inward folding portion 48. As shown in FIGS. 5 and 9, the upper end portion of the inward folding portion 48 is sewn to other parts of the main body fabric portions 43, 44 by the peripheral joint portion 45. When the inward folding portion 48 is formed, the slit 47 is opened to form an insertion port 49 for the gas generator 30.

As shown in FIG. 8, two bolt holes 51 for inserting the bolts 33 of the gas generator 30 (see FIG. 4) are formed at positions below the slit 47 in the main body fabric portion 43 on the inner side.

The interior of the inflation portion 46 is divided into two sections by a lateral partition 60. The lateral partition 60 has the same structure as a component generally referred to as a tether and is located between the main body fabric portions 43 and 44.

<Lateral Partition 60>

As shown in FIGS. 8, 9, and 19A, the lateral partition 60 is formed by folding forward a single fabric piece made of the same material as the main body fabric portions 43, 44 along a second folding line 61, which is defined at the center, to be overlapped in the lateral direction. The overlapped portion is then arranged to bridge lower parts of the main body fabric portions 43, 44. The lateral partition body 60 may also be formed of two fabric pieces divided along the second folding line 61. To distinguish the two overlapped parts of the lateral partition 60, the part located on the inner side is referred to as a first structural fabric portion 62, and the part located on the outer side is referred to as a second structural fabric portion 63.

The lateral partition 60 has downward bulging portions 62*a*, 63*a* at rear portions of the structural fabric portions 62, 63 in the folded lateral partition 60. The lateral partition 60, which is folded in half, is located between the main body fabric portions 43 and 44 with the second folding line 61 matched with the first folding line 42 of the airbag main body 41. The structural fabric portions 62, 63 are each joined to the corresponding one of the main body fabric portions 43, 44 by a first lateral joint portion 64 located along the upper periphery. The structural fabric portions 63, 62 are joined to each other by second lateral joint portions 65 located at the lower peripheral portions. Further, the front ends of the structural fabric portions 62, 63 are sewn to the front ends of the main body fabric portions 43, 44 by the peripheral joint portion 45. A part of the inflation portion 46 below the lateral partition 60 forms a lower inflation chamber 72, which is deployed and inflated beside the lumbar region PP of the occupant P. A part of the inflation portion 46 above the lateral partition 60 forms an upper inflation chamber 73, which is deployed and inflated beside a part above the lumbar region PP of the occupant P that includes the thorax region PT.

Figure 7:
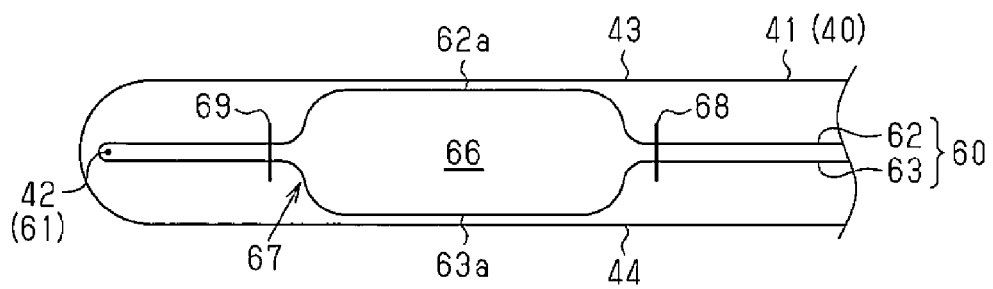
FIG. 7 is a cross-sectional view taken along line 7-7 of FIG. 5.

As shown in FIGS. 7 to 9, the lateral partition 60 has a communication portion 66 and a check valve 67.

<Communication Portion 66 and Check Valve 67>

The communication portion 66 is adapted for connecting the upper inflation chamber 73 and the lower inflation chamber 72 to each other. The second lateral joint portions 65 on the lower side of the lateral partition 60, which is folded in half, are not joined to each other at the rear ends of the structural fabric portions 62, 63. In other words, the second lateral joint portions 65, which join the structural fabric portions 62, 63 to each other, are absent in a part including the second folding line 61. In this manner, the communication portion 66 is formed in an area where the second lateral joint portions 65 are absent and the structural fabric portions 62, 63 are not joined to each other.

The check valve 67 regulates flow of inflation gas at the communication portion 66. The check valve 67 allows inflation gas to flow from the upper inflation chamber 73 to the lower inflation chamber 72, but restricts flow in the opposite direction, or the flow of inflation gas from the lower inflation chamber 72 to the upper inflation chamber 73.

Front peripheral portions of the bulging portions 62*a*, 63*a* of the lateral partition 60, which is folded in half, are joined to each other with front joint portions 68 formed along the peripheral portions. The joint portions 68 are inclined to be lowered toward the front ends. The rear ends of the front joint portions 68 are connected to the rear ends of the second lateral joint portions 65.

The rear parts of the bulging portions 62a, 63a are connected to each other by rear joint portions 69, while being inclined to be lowered toward the front ends. Parts of the bulging portions 62a, 63a that are behind the rear joint portions 69 are sewn to the rear lower end portions of the main body fabric portions 43, 44 by the peripheral joint portion 45.

Parts of the bulging portions 62a, 63a between the front joint portions 68 and the rear joint portions 69 form valve bodies 71 of the check valve 67. The check valve 67 allows flow of inflation gas when one of the valve bodies 71 is separated from the other. This state of the check valve 67 is referred to as a valve opened state. The check valve 67 restricts flow of inflation gas when the valve bodies 71 contact each other in at least parts thereof. This state of the check valve 67 is referred to as a valve closed state. The check valve 67 may be formed by a member separate from the lateral partition 60.

An inner tube 80 is arranged in the rear part of the airbag main body 41 in an uninflated and deployed state and below the insertion port 49.

<Inner Tube 80>

The inner tube 80 regulates the flow of the inflation gas discharged by the inflator 31 through the gas outlet such that a greater amount of the discharged gas is supplied to the lower inflation chamber 72 than to the upper inflation chamber 73.

Figure 10:
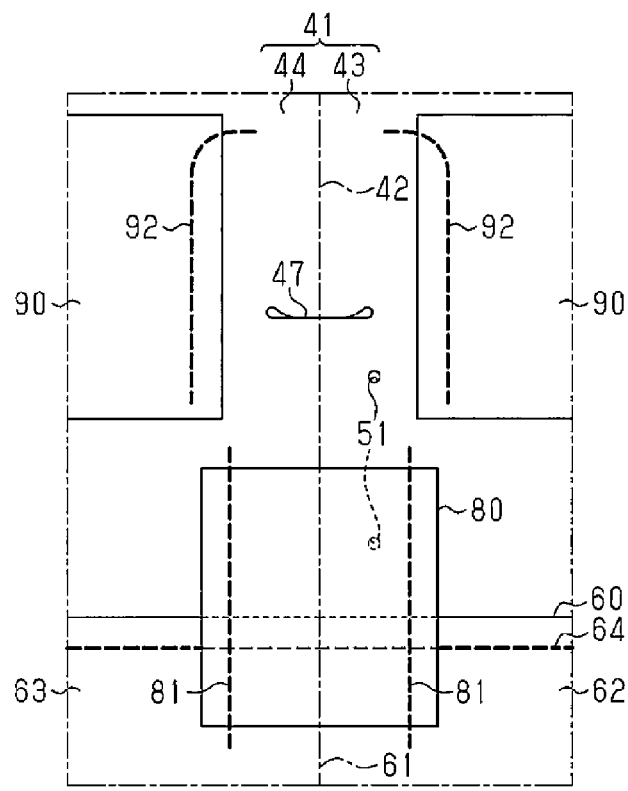
FIG. 10 is a developed partial view of the airbag of the first embodiment in a flatly spread state, illustrating the structure of the vicinity of a first folding line of the airbag main body.

As shown in FIGS. 8 and 10, the inner tube 80 is formed by a single rectangular fabric piece of the same material as the main body fabric portions 43, 44. The fabric piece is joined to the airbag main body 41 and the lateral partition 60 to form the inner tube 80. The inner surfaces of the inner tube 80 may be coated with silicone resin. The inner tube 80 is joined to the airbag main body 41 and the lateral partition 60 by two first vertical joint portions 81, which are located on the opposite sides of the spread inner tube 80 in the lateral direction and extend in the vertical direction. One of the first vertical joint portions 81 joins the inner tube 80 to the first main body fabric portion 43, which is on the inner side, and the first structural fabric portion 62. The other first vertical joint portion 81 joins the inner tube 80 to the second main body fabric portion 44, which is on the outer side, and the second structural fabric portion 63. The inner tube 80 may be formed by two or more fabric pieces.

As shown in FIG. 9, most of the gas generator 30 is accommodated in the rear end portion of the airbag main body 41 in an uninflated and deployed state, while being arranged to extend substantially in the vertical direction. The upper end portion of the gas generator 30 is exposed to the outside of the airbag main body 41 through the insertion port 49. The lower part of the gas generator 30 is inserted into the space between the airbag main body 41 and an area of the inner tube 80 that is located between the first vertical joint portions 81. The lower part of the gas generator 30 may be inserted into the space between the inner tube 80 and the lateral partition 60.

As shown in FIGS. 4 and 8, the bolts 33 of the retainer 32 are passed through the bolt holes 51 of the first main body fabric portion 43, so that the gas generator 30 is secured with its position relative to the airbag main body 41 determined. In this state, the gas outlet at the lower part of the gas generator 30 is located close to the first lateral joint portion 64 on the upper side of the lateral partition 60 at the rear end portion of the upper inflation chamber 73.

As shown in FIGS. 5 and 9, the airbag main body 41 has a vent hole 85 for venting inflation gas.

<Vent Hole 85>

The vent hole 85 is located at the front lower part of the lower inflation chamber 72. The main body fabric portions 43, 44 are not joined at the front lower end portions thereof. The peripheral joint portion 45 has two end portions 45a, which are separate from each other, at the front lower end of the main body fabric portions 43, 44. The airbag main body 41 has surrounding joint portions 86, which join the main body fabric portions 43, 44 to each other while surrounding the end portions 45a. The area that is between the main body fabric portions 43, 44 and between the surrounding joint portions 86 does not function to join the peripheral portions of the main body fabric portions 43, 44 to each other, but forms the vent hole 85, which connects the inside and the outside of the lower inflation chamber 72 to each other. The inflation gas in the lower inflation chamber 72 is discharged to the outside through the vent hole 85.

Another vent hole (not shown) is provided at the front end portion of the upper inflation chamber 73 to vent inflation gas from the upper inflation chamber 73.

Two upper restricting portions 90 are provided inside a section of the upper inflation chamber 73 that is inflated beside at least a part of the thorax region PT of the occupant P. The upper restricting portions 90 restrict the inflated dimension in the front-rear direction of the upper inflation chamber 73, thereby increasing the inflated dimension in the lateral direction.

<Upper Restricting Portions 90>

Figure 21:
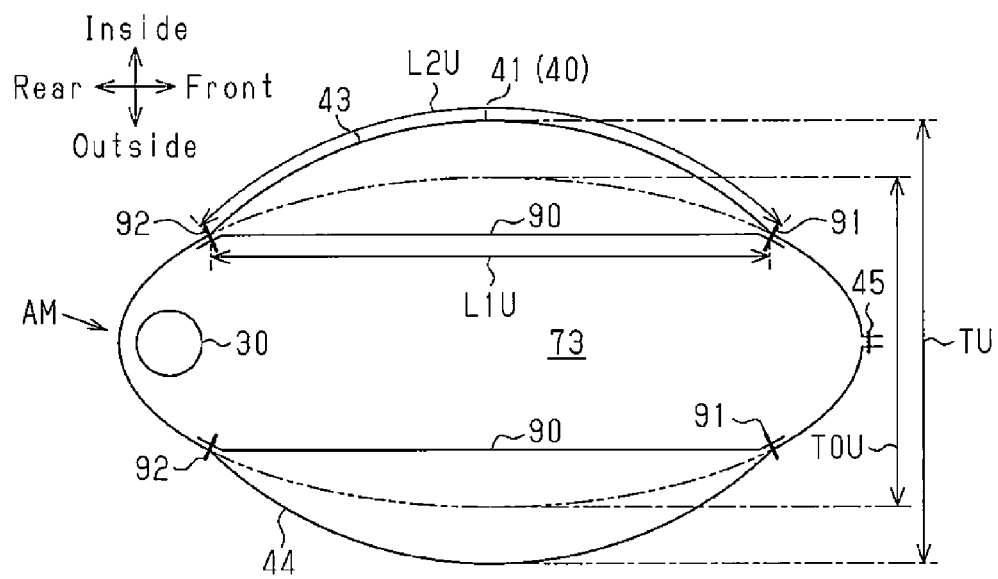
FIG. 21 is a schematic cross-sectional plan view illustrating a state in which the inflated dimension in the front-rear direction of an upper inflation chamber is restricted by upper restricting portions in the first embodiment.

Each upper restricting portion 90 is a rectangular fabric piece of the same sheet material as the main body fabric portions 43, 44. The fabric pieces are joined the main body fabric portions 43, 44 of the airbag main body 41 in a section that corresponds to the side of at least a part of the thorax region PT. As shown in FIG. 21, in each of the main body fabric portions 43, 44, the outer circumferential length in the front-rear direction of the section that is inflated beside at least a part of the thorax region PT is defined as a circumferential length L2U, and the length in the front-rear direction of the upper restricting portion 90 is defined as a front-rear length L1U. The upper restricting portions 90 are each formed such that the front-rear length L1U is shorter than the circumferential length L2U of the main body fabric portions 43, 44.

As shown in FIGS. 8 to 10, each upper restricting portion 90 is located at an upper part of the corresponding one of the main body fabric portions 43, 44 that is above and spaced apart from the inner tube 80. The upper restricting portions 90 are each joined to the corresponding one of the main body fabric portions 43, 44 by a pair of second and third vertical joint portions 91, 92, which is located at the front edge and the rear edge of the upper restricting portion 90. The second vertical joint portion 91, which is on the front side, joins the front edge of the upper restricting portion 90 to the front edge of the corresponding one of the main body fabric portions 43, 44. The third vertical joint portion 92, which is on the rear side, joins the rear edge of each upper restricting portion 90 to the corresponding one of the main body fabric portions 43, 44 at a section slightly forward of the slit 47. In other words, the rear edges of the upper restricting portions 90 are joined to the main body fabric portions 43, 44, respectively, at sections close to the section of the airbag main body 41 that is fixed to the automobile 10 (the side frame portion 15). In this manner, each upper restricting portion 90 is located in a part of the corresponding one of the main body fabric portions 43, 44 that forms the upper inflation chamber 73 and bridges two sections separated in the front-rear direction. A region of each of the main body fabric portions 43, 44 between the front and rear vertical joint portions 91, 92 is slackened.

As described above, the front-rear length L1U of each upper restricting portion 90 is set to be shorter than the circumferential length L2U in the front-rear direction of a section of the upper inflation chamber 73 that is inflated beside at least a part of the thorax region PT of the occupant P. Accordingly, when tensioned due to inflation of the upper inflation chamber 73, the upper restricting portions 90 restrict the inflated dimension in the front-rear direction of the main body fabric portions 43, 44. With such restriction, an inflated dimension TU in the lateral direction of the upper inflation chamber 73 at the section is greater than an inflated dimension T0U in a case in which no upper restricting portions 90 are provided, as shown in FIG. 21.

As shown in FIGS. 21 and 3, an increase amount ΔTU of the inflated dimension (ΔTU=TU−T0U) increases as the difference between the circumferential length L2U and the front-rear length L1U increases. In the first embodiment, the difference between the circumferential length L2U and the front-rear length L1U is set such that, when inflation of the airbag main body 41 is completed, the inflated dimension TU is greater than the inflated dimension TL of the lower inflation chamber 72.

A method for manufacturing the airbag module AM, which has the above described configuration, will now be described with reference to FIGS. 11 to 18B. In the manufacture, the airbag module AM is manufactured at two different manufacturing bases (a first manufacturing base and a second manufacturing base).

At the first manufacturing base, an airbag module in an intermediate form for transportation (hereinafter referred to as a module preassembly AM') shown in FIG. 18A is manufactured. At this stage, the inflator 31 is not inserted in the retainer 32. The module preassembly AM' is transported from the first manufacturing base to the second manufacturing base. At the second manufacturing base, an inflator 31 is inserted and secured in a retainer 32 in the module preassembly AM'.

In this description, the process performed for manufacturing the module preassembly AM' at the first manufacturing base will mainly be discussed.

<First Step>

Figure 11:
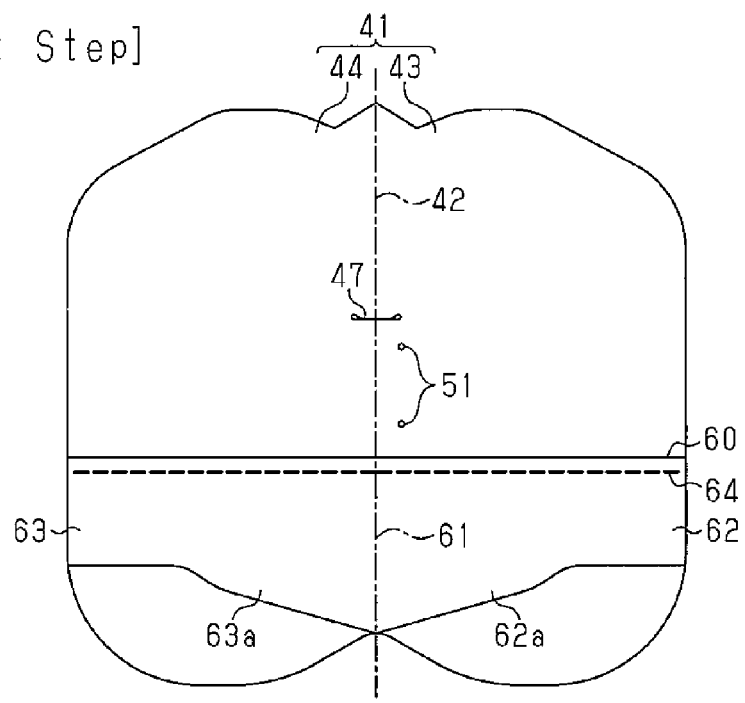
FIG. 11 is an explanatory diagram showing a first step in the procedure for a module preassembly according to the first embodiment.

As shown in FIG. 11, the airbag main body 41 and the lateral partition 60 are spread in the first step. The slit 47, the bolt holes 51, and the like may be formed in the airbag main body 41 in advance.

With the second folding line 61 matched with the first folding line 42, the lateral partition 60 is laid on a lower part of the airbag main body 41. The lateral partition 60 is sewn to the airbag main body 41 along the upper peripheral portion to form the first lateral joint portion 64.

The slit 47, the bolt holes 51 and the like may be formed in the airbag main body 41 after the first lateral joint portion 64 is formed.

<Second Step>

As shown in FIG. 12, the lateral partition 60 and the airbag main body 41 are spread. The inner tube 80 and the two upper restricting portions 90 are spread.

The inner tube 80 is laid on the folding lines 42, 61 to bridge the airbag main body 41 and the lateral partition 60. The inner tube 80 is sewn to the main body fabric portions 43, 44 and the lateral partition 60 along the left and right side edges to form the first vertical joint portions 81. The inner tube 80 is thus joined to the airbag main body 41 and the lateral partition 60 by the first vertical joint portions 81.

At the second step, the upper restricting portions 90 are laid on upper parts of the main body fabric portions 43, 44 that are above the inner tube 80 and slightly separated from the slit 47. Of the left and right edges of each upper restricting portion 90, the edge that is closer to the slit 47 is sewn to the corresponding one of the main body fabric portions 43, 44 to form the third vertical joint portion 92. The upper restricting portions 90 are joined to the main body fabric portions 43, 44 by the third vertical joint portions 92.

<Third Step>

At the third step, the left and right edges of the spread airbag main body 41 are brought closer to the first folding line 42 as shown in FIG. 13A. This slackens the main body fabric portions 43, 44 (refer to FIG. 13B). The left and right edges of the airbag main body 41 are laid on the corresponding edges of the upper restricting portions 90. In this state, the upper restricting portions 90 are sewn to the main body fabric portions 43, 44 along the edges laid on the edges of the airbag main body 41 to form the second vertical joint portions 91. The upper restricting portions 90 are joined to the main body fabric portions 43, 44 by the second vertical joint portions 91 in addition to the third vertical joint portions 92.

<Fourth Step>

Figure 14:
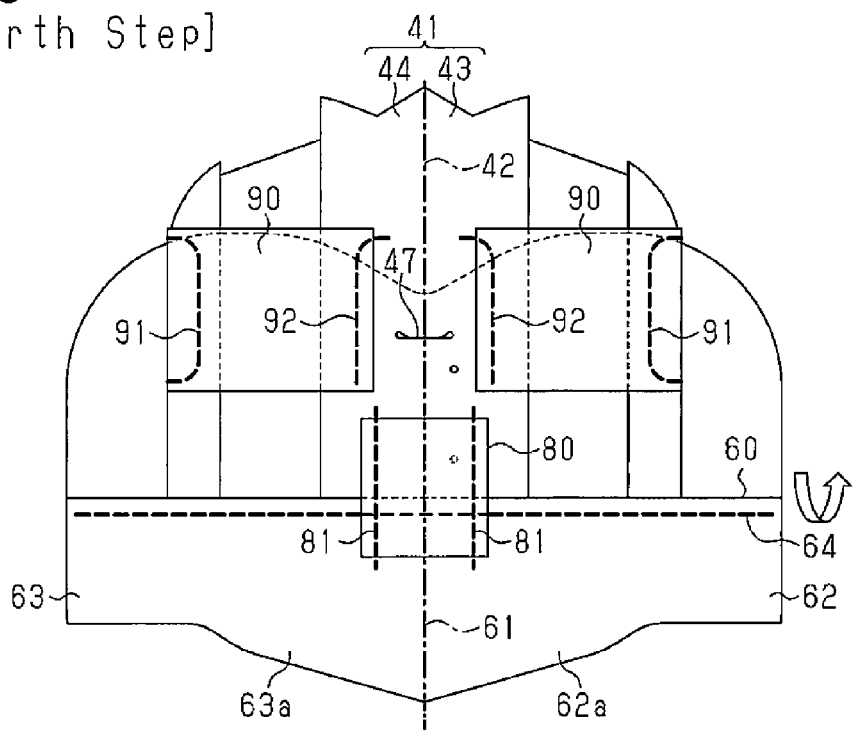
FIG. 14 is an explanatory diagram showing a fourth step in the procedure for a module preassembly according to the first embodiment.

At the fourth step, as shown in FIG. 14, parts of the main body fabric portions 43, 44 that are below the first lateral joint portion 64 and the first vertical joint portions 81 are folded upward and outward (the direction indicated by the arrow in FIG. 14). This exposes at least the lower peripheral portion of the lateral partition 60.

Figure 15:
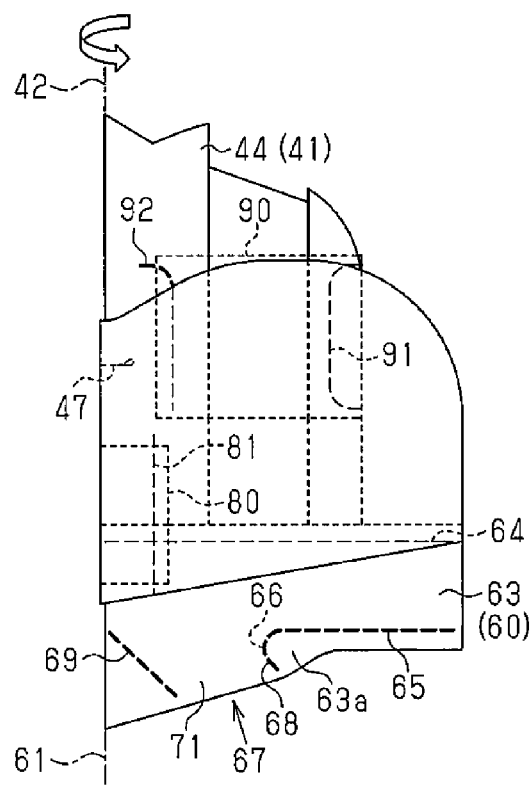
FIG. 15 is an explanatory diagram showing a fourth step in the procedure for a module preassembly according to the first embodiment.

Subsequently, as indicated by the arrow in FIG. 15, the airbag main body 41 is folded in half along the first folding line 42. Accordingly, the structural fabric portions 62, 63 of the lateral partition 60 are laid on each other.

In this state, the lower peripheral portions of the structural fabric portions 62, 63 are sewn to each other to form the second lateral joint portion 65 on the lower side and the communication portion 66. Peripheral portions of the bulging portions 62a, 63a that are away from the folding lines 42, 61 are sewn to each other to form the front joint portion 68. Peripheral portions closer to the folding lines 42, 61 are sewn to each other to form the rear joint portion 69. The formation of the front joint portion 68 and the rear joint portion 69 forms a check valve 67, which has a pair of valve bodies 71, in the lateral partition 60.

<Fifth Step>

At the fifth step, the lower portions of the main body fabric portions 43, 44, which have been folded back, are unfolded as shown in FIG. 16. At this time, the upper restricting portions 90 restrict movement in the front rear direction of the main body fabric portions 43, 44 in the airbag main body 41 in an uninflated and deployed state. In each of the main body fabric portions 43, 44, a portion (upper part) that corresponds to the upper restricting portion 90 is slacked (refer to FIG. 13B). As shown in FIG. 16, the upper part of each of the main body fabric portions 43, 44 is narrower than the lower part.

Parts of the main body fabric portions 43, 44 above the slit 47 are tucked inward of the remaining parts to form the inward folding portion 48.

In this state, the peripheral portions of the main body fabric portions 43, 44 are sewn to each other at two spots at the lower ends of the main body fabric portions 43, 44 to form a pair of surrounding joint portions 86. A vent hole 85 is formed between the main body fabric portions 43, 44 and in an area between the surrounding joint portions 86, which are adjacent to each other.

Subsequently, the lower peripheral portions of the main body fabric portions 43, 44 are sewn to each other to form a part of the peripheral joint portion 45. At this time, the peripheral joint portion 45 is not formed in the surrounding joint portions 86, so that a pair of separate end portions 45*a* is formed.

<Sixth Step>

After the fifth step, parts (upper parts) of the main body fabric portions 43, 44 that correspond to the upper restricting portions 90 are slackened. Therefore, the front ends and the upper ends of the main body fabric portions 43, 44, which are yet to be sewn in the peripheral portions, cannot be easily laid on and sewn to each other in a planar state.

Thus, at the sixth step, the rear ends of the main body fabric portions 43, 44 in the airbag main body 41 in an uninflated and deployed state are tucked inward of the remaining parts. At this time, the slackened parts of the main body fabric portions 43, 44 are pulled rearward and almost flattened. This reduces the apparent front-rear length of the airbag main body 41.

Subsequently, the front peripheral portions of the main body fabric portions 43, 44 are sewn to each other. Also, the upper peripheral portions of the main body fabric portions 43, 44 are sewn to each other except for the rear halves. A part of the peripheral joint portion 45 is thus formed.

After the sixth step, the rear halves of the upper ends of the main body fabric portions 43, 44 have not been sewn to each other. The unsewn part connects the interior of the main body fabric portions 43, 44 with the outside.

<Seventh Step>

At the seventh step, as shown in FIGS. 18A and 18B, the rear ends of the main body fabric portions 43, 44, which have been tucked inward of the remaining parts, are pulled out rearward.

The retainer 32, which is shown by a long dashed double-short dashed line in FIG. 18A, is inserted into the rear end between the main body fabric portions 43, 44 (the interior of the airbag main body 41) through the unsewn parts of the upper ends of the main body fabric portions 43, 44.

The upper end of the retainer 32 is exposed to the outside of the airbag main body 41 through the insertion port 49, and the lower portion of the retainer 32 is inserted between the inner tube 80 and the airbag main body 41. The bolts 33 of the retainer 32 are inserted in the bolt holes 51 of the main body fabric portion 43. Then, as illustrated by solid lines and broken lines, the retainer 32 is positioned relative to and secured to the airbag main body 41.

Thereafter, the upper peripheral portions of the main body fabric portions 43, 44 are sewn to each other to form the remainder of the peripheral joint portion 45.

In this manner, the module preassembly AM', which has the retainer 32 arranged in the airbag 40, is obtained.

The airbag main body 41 is folded to make the module preassembly AM' compact, which is then transported to the second manufacturing base.

At the second manufacturing base, an inflator 31 is inserted into the retainer 32 in the module preassembly AM'. The retainer 32 is fastened to the inflator 31 to secure the inflator 31 to the retainer 32. Accordingly, an airbag module AM is obtained that has a compact form (hereinafter, referred to as a storage form), which is easily stored in the storage portion 18 in the seat back 14, which has a limited size (refer to FIG. 4).

When the airbag module AM is installed in the automobile seat 12, the airbag module AM is stored in the storage portion 18 as shown in FIG. 4. The bolts 33, which extend from the gas generator 30 and are inserted in the bolt holes 51 of the first main body fabric portion 43, are inserted in the side frame portion 15. Nuts 34 are threaded to the bolts 33, which are passed though the side frame portion 15. This secures the gas generator 30 to the side frame portion 15 together with the airbag main body 41. In this manner, the gas generator 30 is fixed to the automobile 10 via the side frame portion 15. This process may be done either at the second manufacturing base or another manufacturing base.

The gas generator 30 may be attached to the side frame portion 15 using members other than the bolts 33 and the nuts 34. The inflator 31 may be directly attached to the side frame portion 15 without using the retainer 32.

As shown in FIG. 1, the side airbag apparatus includes an impact sensor 95 and a controller 96 in addition to the above described airbag module AM. The impact sensor 95 includes an acceleration sensor or the like and is provided on the body side portion 11 of the automobile 10. The impact sensor 95 detects an impact applied to the body side portion 11 from the exterior. The controller 96 controls activation of the inflator 31 based on a detection signal from the impact sensor 95.

The automobile 10 has, in the passenger compartment, a seat belt apparatus for restraining the occupant P seated on the automobile seat 12. However, illustration of the seat belt apparatus is omitted in FIGS. 1 to 3.

The side airbag apparatus of the first embodiment is constructed as described above. Operation of the side airbag apparatus will now be described.

According to this side airbag apparatus, when the impact sensor 95 does not detect any impact from the side of the body side portion 11, the controller 96 does not output to the inflator 31 an activation signal for activating the inflator 31. Thus, the inflator 31 does not discharge inflation gas. The airbag main body 41 remains accommodated in the storage portion 18 in the storage form.

When the impact sensor 95 detects that an impact of a magnitude greater than or equal to a predetermined value has been applied to the body side portion 11 due to a side collision or the like while the automobile 10 is running, the controller 96, based on the detection signal, outputs an activation signal for activating the inflator 31 to the inflator 31. In response to the activation signal, the inflator 31 discharges inflation gas through the gas outlet. The discharged gas is divided into gas flowing upward and gas flowing downward by the inner tube 80. The amount of the inflation gas flowing downward is greater than the amount of the inflation gas flowing upward. The inflation gas that has been delivered upward is supplied to the upper inflation chamber 73 from the upper end of the inner tube 80. The inflation gas thus increases the internal pressure of the upper inflation chamber 73, so that the upper inflation chamber 73 starts being inflated.

The inflation gas that has been delivered downward is supplied to the check valve 67 from the lower end of the inner tube 80. During the period in which inflation gas is being supplied to the check valve 67, a force that deforms the valve bodies 71 into a tubular shape is generated. Thus, the inflation gas passes between the communication portion 66 and the valve bodies 71 and flows into the lower inflation chamber 72. The inflation gas thus increases the internal pressure of the lower inflation chamber 72, so that the lower inflation chamber 72 starts being inflated.

Continuous supply of the inflation gas from the inflator 31 increases the internal pressure of the upper inflation chamber 73 and the lower inflation chamber 72. Since the lower inflation chamber 72 receives a greater amount of inflation gas than the upper inflation chamber 73, the internal pressure of the lower inflation chamber 72 becomes higher than that of the upper inflation chamber 73. Inflation of the upper inflation chamber 73 and the lower inflation chamber 72 causes the lateral partition 60 to be pulled toward the opposite sides in the lateral direction.

Figure 20:
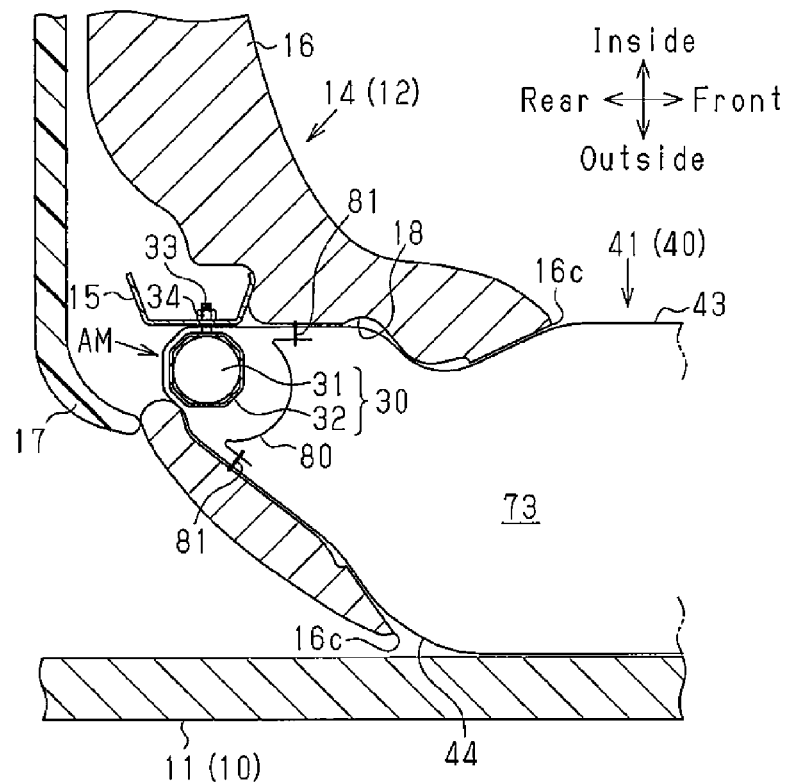
FIG. 20 is a partial cross-sectional plan view illustrating a state in which the airbag main body of FIG. 4 has been projected from the automobile seat to be deployed and inflated with a part remaining in the seat back.

The upper inflation chamber 73 and the lower inflation chamber 72 are unfolded in the reverse order of that when these were folded. This is because parts in the airbag 40 that were folded in later stages restrict parts that were folded in earlier stages from being unfolded. The airbag 40, which is deployed and inflated in the above described manner, pushes the seat pad 16 of the seat back 14, so that the seat pad 16 is broken at the breakable portion 21 (see FIG. 4). As shown in FIG. 20, the airbag main body 41 is projected forward from the seat back 14 through the broken area while part of the airbag main body 41 is remaining in the storage portion 18.

The airbag 40, which continues being supplied with inflation gas, is deployed while being unfolded forward between the body side portion 11 and the upper body of the occupant P seated in the automobile seat 12 as indicated by long dashed double-short dashed lines in FIGS. 2 and 3. As shown in FIG. 9, the upper inflation chamber 73 is deployed and inflated beside a part of the body of the occupant P that is above the lumbar region PP and includes the thorax region PT. The lower inflation chamber 72 is deployed and inflated beside the lumbar region PP of the occupant P with an internal pressure higher than that of the upper inflation chamber 73.

Thus, the lumbar region PP, which has a higher impact resistance than the thorax region PT, is pushed by the lower inflation chamber 72, which is inflated with a high internal pressure. The thorax region PT, which has a lower impact resistance than the lumbar region PP, is pushed by the upper inflation chamber 73, which is inflated with a lower internal pressure than that of the lower inflation chamber 72. As a result, the lumbar region PP and the thorax region PT are restrained by the lower inflation chamber 72 and the upper inflation chamber 73, respectively, with a pressure distribution appropriate for the respective impact resistances. The impact from the side, which is transmitted via the body side portion 11, is reduced by the lower inflation chamber 72 and the upper inflation chamber 73, so that the lumbar region PP and the thorax region PT are protected.

As shown in FIG. 19B, the lateral partition 60 is tensioned when pulled toward the opposite sides in the lateral direction. The lateral partition 60 in the tensioned state restricts the inflated dimensions in the lateral direction of the lower inflation chamber 72 and the upper inflation chamber 73.

As the upper inflation chamber 73 is deployed and inflated, the two upper restricting portions 90 are tensioned in the front-rear direction beside the thorax region PT of the occupant P as shown in FIG. 21. As described above, the front-rear length L1U of each upper restricting portion 90 is set to be shorter than the circumferential length L2U in the front-rear direction of a section of the upper inflation chamber 73 that is inflated beside at least a part of the thorax region PT of the occupant P.

Further, the rear edges of the upper restricting portions 90 are joined to the main body fabric portions 43, 44, respectively, at areas close to the rear end of the airbag main body 41, which are fixed to the automobile 10 (the side frame portion 15). In other words, the rear edges of the upper restricting portions 90 are joined to the automobile 10 (the side frame portion 15) via the rear end of the airbag main body 41. The front edges of the upper restricting portions 90 are joined to the main body fabric portions 43, 44, respectively, at areas that are forward of and away from the fixed areas of the rear edges of the upper restricting portions 90.

Therefore, the forward deployment and inflation of the upper inflation chamber 73 are restricted by the upper restricting portions 90, which are tensioned in the front-rear direction. This restricts the inflated dimension in the front-rear direction of the upper inflation chamber 73.

In the main body fabric portions 43, 44, the parts that are located between the areas joined to the front edges of the upper restricting portions 90 and the areas that are joined to the rear edges of the upper restricting portions 90 act to be inflated in the lateral direction, in which the inflated dimension is not restricted by the upper restricting portions 90. Thus, when the inflation of the airbag main body 41 is completed, the inflated dimension TU in the lateral direction of a section of the upper inflation chamber 73 that is inflated beside the thorax region PT is greater than the inflated dimension TL (FIG. 3) of the lower inflation chamber 72.

In the first embodiment, the main body fabric portions 43, 44 each have an upper restricting portion 90. Thus, in the upper inflation chamber 73, the inflated dimension TU in the lateral direction of a section that is inflated beside the thorax region PT of the occupant P is increased toward the opposite sides in the lateral direction. Therefore, that section of the upper inflation chamber 73 is inflated by a greater amount in the lateral direction than that in a case in which only one of the main body fabric portions 43, 44 has an upper restricting portion 90. This increases the inflated dimension TU of that section of the upper inflation chamber 73.

As a result, although inflated and deployed with an internal pressure lower than that of the lower inflation chamber 72, that section of the upper inflation chamber 73 is largely inflated in the lateral direction, so that the inflated dimension TU in the lateral direction of that section of the upper inflation chamber 73 is increased. Accordingly, a greater amount of energy can be absorbed.

As shown in FIG. 9, when the discharge of inflation gas from the inflator 31 stops and the inflation gas in the lower inflation chamber 72 acts to flow to the upper inflation chamber 73, the valve bodies 71 of the check valve 67 are pushed by the high pressure in the lower inflation chamber 72 and contact each other. The check valve 67 is thus closed and prevents the inflation gas in the lower inflation chamber 72 from flowing out to the upper inflation chamber 73 after sequentially flowing through the space between the valve bodies 71 and the communication portion 66. Therefore, the internal pressure of the lower inflation chamber 72, which has been increased to a level adequate for protecting the lumbar region PP of the occupant P, or an internal pressure higher than that of the upper inflation chamber 73, is prevented from being reduced by outflow.

Excessive inflation gas in the lower inflation chamber 72 is discharged forward and downward of the airbag 40 via the vent hole 85. Excessive inflation gas in the upper inflation chamber 73 is discharged forward of the airbag 40 via a vent hole (not shown). In this manner, when the occupant P is restrained by the airbag 40, the internal pressures of the lower inflation chamber 72 and the upper inflation chamber 73 are lowered, so that the occupant P is pushed with an adequate pressing force.

The first embodiment as described above has the following advantages.

(1) The first embodiment is applied to the airbag 40 having the following construction. That is, the interior of the airbag main body 41 is divided into the upper inflation chamber 73 and the lower inflation chamber 72 by the lateral partition 60. The upper inflation chamber 73 is inflated beside a part of the body of the occupant P that is above the lumbar region PP. The lower inflation chamber 72 is inflated beside the lumbar region PP of the occupant P with an internal pressure that is higher than that of the upper inflation chamber 73 (FIG. 9).

The upper inflation chamber 73 incorporates the sheet-like upper restricting portions 90 in a section that is inflated beside at least a part of the thorax region PT of the occupant P. Each upper restricting portion 90 has a length L1U in the front-rear direction, which is shorter than the circumferential length L2U of that section of the upper inflation chamber 73. In other words, the upper inflation chamber 73 includes a first section, which is inflated beside at least a part of the thorax region PT of the occupant P, and the lower inflation chamber 72 includes a second section, which is inflated beside the lumbar region PP of the occupant P. The upper inflation chamber 73 is located above the second section of the lower inflation chamber 72. The upper restricting portions 90 are provided in the first section of the upper inflation chamber 73. In this case, the upper restricting portions 90 are tensioned when the upper inflation chamber 73 is inflated. When inflation of the airbag main body 41 is completed, the upper restricting portions 90 restrict the inflated dimension in the front-rear direction in the first section of the upper inflation chamber 73 such that the inflated dimension TU in the lateral direction of the upper inflation chamber 73 is greater than the inflated dimension TL in the lateral direction of the lower inflation chamber 72 (FIGS. 3 and 21).

Thus, the first section of the upper inflation chamber 73, that is, a section of the upper inflation chamber 73 that is inflated beside at least a part of the thorax region PT of the occupant P, is largely inflated in the lateral direction, so that the energy absorption amount of the upper inflation chamber 73 is increased. This further improves the protection performance of the upper inflation chamber 73 for the thorax region PT.

(2) The protection performance of the upper inflation chamber 73 for the thorax region PT can be improved by increasing the volume of the inflation portion 46 of the airbag main body 41, that is, by increasing the size of the inflation portion 46 to increase the inflated dimension in the lateral direction of the upper inflation chamber 73. In this case, a large sized airbag main body 41 would be required. Also, a large sized inflator 31, which discharges a greater amount of inflation gas, would be required. This would increase the weight of the airbag module AM, which is not desirable in reduction of the weight of the automobile.

In this respect, according to the first embodiment, the inflated dimension TU in the lateral direction of a section of the upper inflation chamber 73 that is inflated beside the thorax region PT is increased simply by adding the upper restricting portions 90 without changing the volume of the inflation portion 46 of the airbag main body 41 (FIG. 21).

Therefore, without having to use a large sized airbag main body 41 or a large sized inflator 31, the protection performance for the thorax region PT is improved while preventing the weight of the airbag module AM from being increased.

(3) A greater amount of inflation gas from the inflator 31 is supplied to the lower inflation chamber 72 than to the upper inflation chamber 73. The lateral partition 60 has the check valve 67, which restrains the inflation gas that has been supplied by the inflator 31 and flowed into the lower inflation chamber 72 from flowing out to the upper inflation chamber 73 (FIGS. 7 and 9).

Thus, in the airbag 40, which has the construction described in the above (1), the internal pressure of the lower inflation chamber 72 can be made higher than that of the upper inflation chamber 73.

(4) The peripheral portions of a pair of the main body fabric portions 43, 44, which are laid on each other in the lateral direction, are joined to each other at the peripheral joint portion 45 to form the airbag main body 41. The front edges and the rear edges of the upper restricting portions 90 are joined to the main body fabric portions 43, 44, respectively (FIG. 21).

Therefore, in the main body fabric portions 43, 44, parts that are located between the areas that are joined to the front edges of the upper restricting portions 90 and the areas that are joined to the rear edges of the upper restricting portions 90 are inflated outward in the lateral direction, so that the inflated dimension TU in the lateral direction of the section of the upper inflation chamber 73 that is inflated beside the thorax region PT is increased.

Further, since the upper restricting portions 90 are joined to the airbag main body 41 by being joined to the main body fabric portions 43, 44, that section of the upper inflation chamber 73 can be inflated by a greater amount in the lateral direction than in a case in which only one of the main body fabric portions 43, 44 has an upper restricting portion 90. This further increases the inflated dimension TU.

(5) The rear edges of the upper restricting portions 90 are joined to the main body fabric portions 43, 44, respectively, at areas close to the areas of the airbag main body 41 that are fixed to the automobile 10 (the side frame portion 15) as illustrated in FIG. 21.

Therefore, the forward deployment and inflation of the upper inflation chamber 73 are restricted by the upper restricting portions 90, which are tensioned in the front-rear direction. As a result, even if an obstacle is present in front of the storage portion 18, it is possible to restrain the obstacle from being strongly pushed by the upper inflation chamber 73.

Second Embodiment

An automobile side airbag apparatus according to a second embodiment will now be described with reference to FIGS. 22 to 25.

In the second embodiment, a vertical partition 100 is provided in the inflation portion 46 in addition to the lateral partition 60. Like the lateral partition 60, the vertical partition 100 has the same structure as a member generally referred to as a tether.

<Vertical Partition 100>

Figure 23:
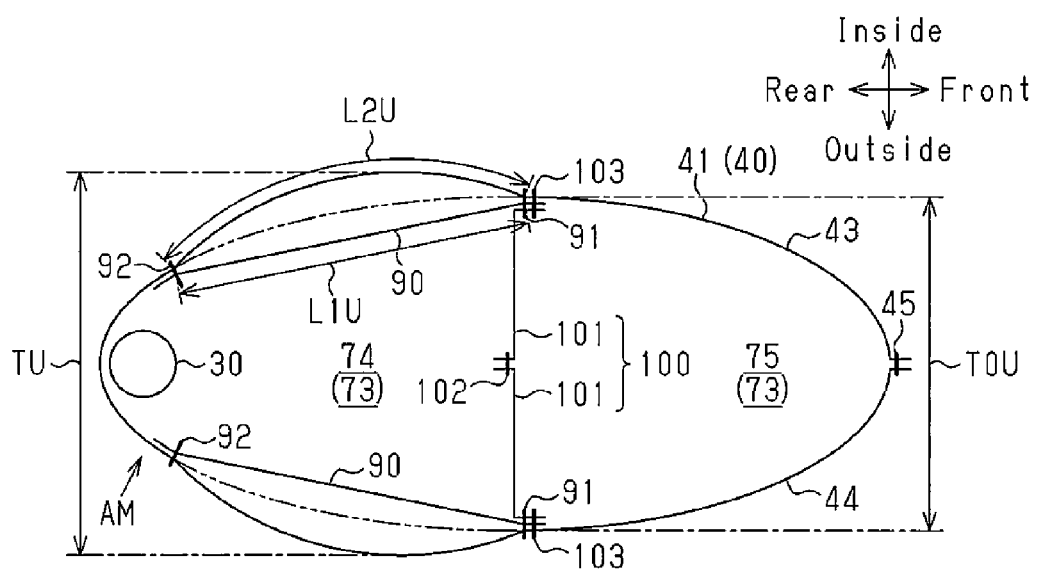
FIG. 23 is a schematic cross-sectional plan view illustrating a state in which the inflated dimension in the front-rear direction of an upper-rear inflation chamber is restricted by upper restricting portions in the second embodiment.
Figure 24:
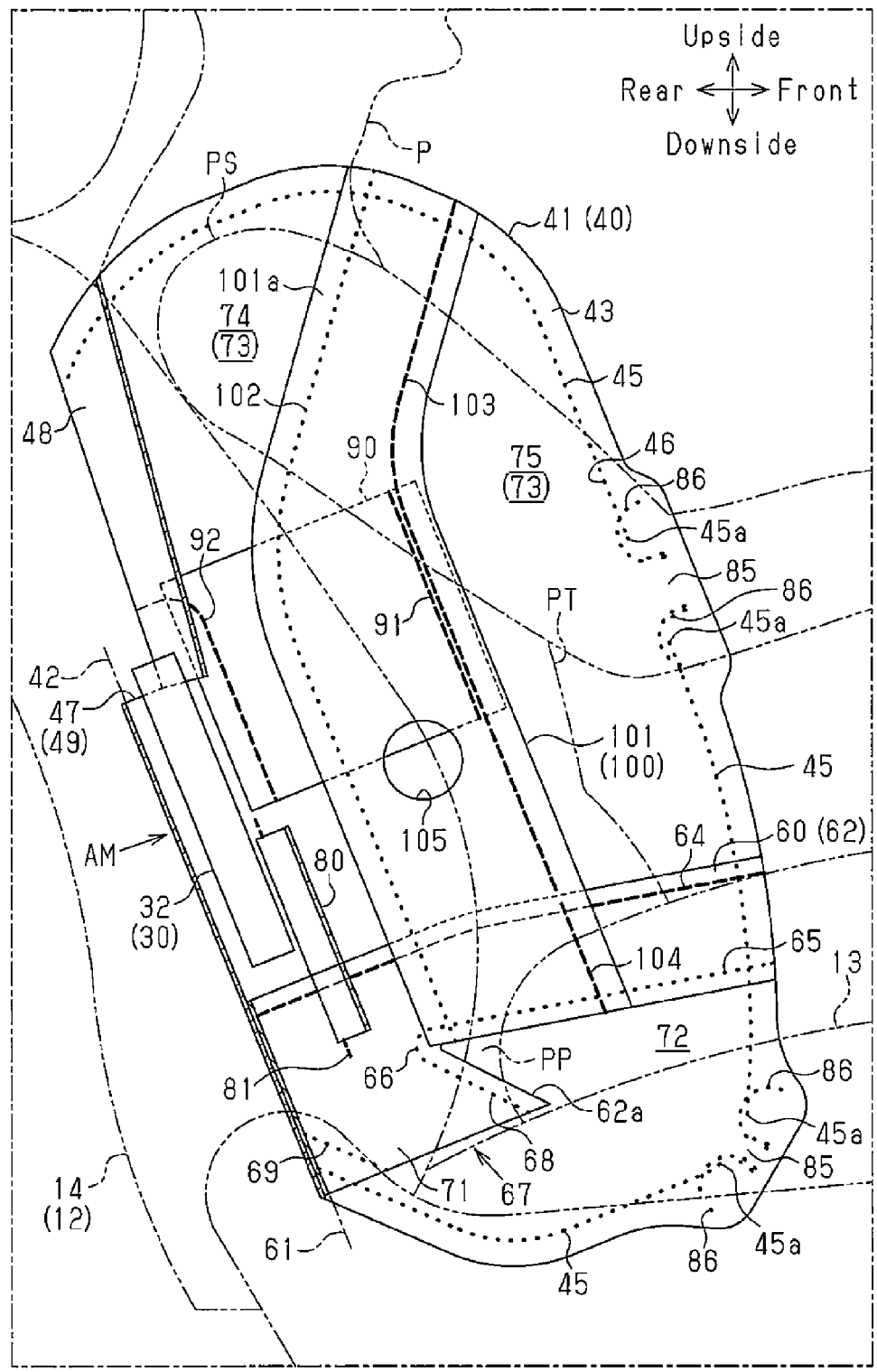
FIG. 24 is a cross-sectional side view illustrating, together with an occupant and an automobile seat, the internal structure of the airbag module of FIG. 22.

As shown in FIGS. 23 and 24, the vertical partition 100 divides the upper inflation chamber 73 into front and rear two parts and has a pair of fabric pieces 101, which are made of the same material as that of the main body fabric portions 43, 44. Each fabric piece 101 has an inclined portion 101a, which is inclined forward. The fabric pieces 101 are joined to each other by a first side edge joint portion 102 provided along the rear side edges.

The upper ends of the inclined portions 101a of the fabric pieces 101 are sewn to the upper ends of the main body fabric portions 43, 44 by the peripheral joint portion 45. The lower parts of the fabric pieces 101 are laid on the structural fabric portions 62, 63 of the lateral partition 60. The lower ends of the fabric pieces 101 are sewn to the structural fabric portions 62, 63 by the second lateral joint portions 65 on the lower side.

In an area that is not overlapped with the structural fabric portions 62, 63, the fabric pieces 101 are joined to the main body fabric portions 43, 44 by second side edge joint portions 103 provided along the front side edges. In an area that is overlapped with the structural fabric portions 62, 63, the fabric pieces 101 are joined only to the structural fabric portions 62, 63 by third side edge joint portions 104 provided below the second side edge joint portions 103.

A part of the upper inflation chamber 73 that is rearward of the vertical partition 100 forms an upper-rear inflation chamber 74. The gas generator 30 is located at the rear end of the upper-rear inflation chamber 74. The upper-rear inflation chamber 74 is supplied with inflation gas from the inflator 31 to be deployed and inflated beside the rear half of the thorax region PT and the shoulder region PS in the upper body of the occupant P. The part of the upper-rear inflation chamber 74 that is inflated beside the shoulder region PS of the occupant P is located rearward of the inclined portions 101a.

The part of the upper inflation chamber 73 forward of the vertical partition 100 forms an upper-front inflation chamber 75, which is deployed and inflated beside the front half of the thorax region PT in the upper body of the occupant P. The upper-front inflation chamber 75 is supplied with inflation gas via the upper-rear inflation chamber 74 and the vertical partition 100. The upper-rear inflation chamber 74 and the upper-front inflation chamber 75 are located in front of and behind each other with the vertical partition 100 in between.

The vertical partition 100 has communication portions 105, which connect the upper-rear inflation chamber 74 and the upper-front inflation chamber 75 with each other. In the second embodiment, the fabric pieces 101 each have a hole as a communication portion 105.

Each fabric piece 101 may have two or more communication portions 105. Only one of the fabric pieces 101 may have a communication portion 105. In a case in which the vertical partition 100 is formed by folding a single fabric piece in half, the communication portion 105 may be formed on the folding line of the vertical partition 100. In this case, two or more communication portions 105 may be formed.

The upper-front inflation chamber 75 has a vent hole 85, which has the same structure as the vent hole 85 at the front lower part of the lower inflation chamber 72. The inflation gas in the upper-front inflation chamber 75 is discharged through the vent hole 85 of the upper-front inflation chamber 75.

Each upper restricting portion 90 is located at an upper part of the corresponding one of the main body fabric portions 43, 44 that is above and spaced apart from the inner tube 80. The front edge of each upper restricting portion 90 is joined to at least one of the vertical partition 100 or the corresponding one of the main body fabric portions 43, 44 by the second vertical joint portion 91 in the vicinity of the corresponding one of the second side edge joint portions 103 of the vertical partition 100.

As in the first embodiment, the rear edges of the upper restricting portions 90 are joined, by the third vertical joint portions 92, to the main body fabric portions 43, 44, respectively, at areas slightly forward of the slit 47, that is, at the area close to the areas of the airbag main body 41 that are fixed to the automobile 10 (the side frame portion 15). In this manner, each upper restricting portion 90 is located in a part of the corresponding one of the main body fabric portions 43, 44 that forms the upper-rear inflation chamber 74 and bridges two sections separated in the front-rear direction. A region of each of the main body fabric portions 43, 44 between the vertical joint portions 91, 92 is slackened.

Other than these differences, the second embodiment is the same as the first embodiment. Thus, like or the same reference numerals are given to those components that are like or the same as the corresponding components described above in the first embodiment and detailed explanations are omitted.

In the side airbag apparatus of the second embodiment, when an impact is applied to the body side portion 11 from the side of the automobile seat 12, the inflator 31 discharges inflation gas. The inflation gas is divided into gas flowing upward and gas flowing downward by the inner tube 80. The inflation gas that has been delivered upward is supplied to the upper-rear inflation chamber 74 from the upper end of the inner tube 80. The inflation gas deploys and inflates the upper-rear inflation chamber 74 beside the shoulder region PS and the rear half of the thorax region PT of the occupant P.

As the inflation of the upper-rear inflation chamber 74 progresses, the inflation gas in the upper-rear inflation chamber 74 flows into the upper-front inflation chamber 75 via the communication portions 105, so that the upper-front inflation chamber 75 starts inflating with a delay from the upper-rear inflation chamber 74. The upper-front inflation chamber 75, the internal pressure of which is lower than the upper-rear inflation chamber 74, is deployed and inflated beside the front half of the thorax region PT, which has a lower impact resistance than the shoulder region PS and the rear half of the thorax region PT.

The upper inflation chamber 73 is divided into the upper-rear inflation chamber 74 and the upper-front inflation chamber 75 by the vertical partition 100. Therefore, the volume of the upper-rear inflation chamber 74 is smaller than that of the upper inflation chamber 73 when not divided. Thus, the internal pressure of the upper-rear inflation chamber 74 starts to increase earlier and to a higher level, in comparison to the case in which the upper inflation chamber 73 is not divided. Thus, the rear half of the part of the body of the occupant P above the lumbar region PP is quickly restrained and protected by the upper-rear inflation chamber 74.

As the upper-rear inflation chamber 74 is deployed and inflated, the two upper restricting portions 90 are tensioned in the front-rear direction beside the rear half of the thorax region PT of the occupant P. The forward deployment and inflation of the upper-rear inflation chamber 74 are restricted by the upper restricting portions 90, as in the case of the first embodiment. That is, the upper restricting portions 90 restrict the inflated dimension in the front-rear direction of the upper-rear inflation chamber 74.

The upper-rear inflation chamber 74 is inflated in the lateral direction, which is not restricted by the upper restricting portions 90. When the inflation of the airbag main body 41 is completed, the inflated dimension TU (refer to FIG. 23) in the lateral direction of a section of the upper-rear inflation chamber 74 that is inflated beside the rear half of the thorax region PT is greater than the inflated dimension TL (refer to FIG. 25) in the lateral direction of the lower inflation chamber 72. This increases the amount of energy absorbed by that section of the upper-rear inflation chamber 74, so that the protection performance for the rear half of the thorax region PT is improved.

A part of the upper-rear inflation chamber 74 that is rearward of the inclined portions 101a in an upper part of the vertical partition 100 is inflated beside the shoulder region PS of the occupant P to restrain the shoulder region PS, thereby protecting the shoulder region PS from an impact.

Figure 25:
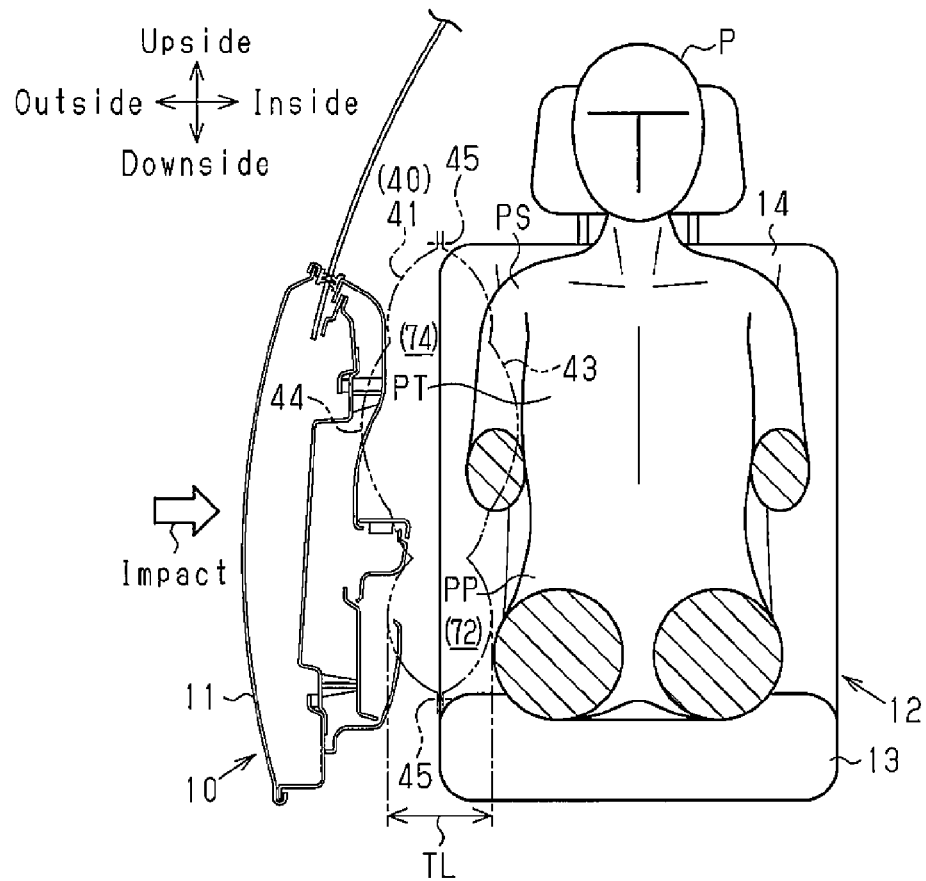
FIG. 25 is a cross-sectional front view of the positional relationship of the automobile seat, the airbag, the occupant, and the body side portion in the second embodiment.

In the gap between the occupant P seated in the automobile seat 12 and the body side portion 11, the space between the shoulder region PS of the occupant P and the body side portion 11 is narrower than the space between any other area, such as the thorax region PT, and the body side portion 11 (refer to FIG. 25). Thus, when the upper-rear inflation chamber 74 is deployed and inflated at an area where the space is narrow, for example, the area beside the shoulder region PS, it is preferable that the upper-rear inflation chamber 74 be inflated with a small inflated dimension in the lateral direction.

In this respect, according to the second embodiment, the upper restricting portions 90 are located at areas below the inclined portions 101a in the upper-rear inflation chamber 74. Therefore, the upper-rear inflation chamber 74 is inflated to have a great inflated dimension TU in the lateral direction at an area below the shoulder region PS of the occupant, that is, at the area beside the rear half of the thorax region PT. The upper-rear inflation chamber 74 is inflated to have a small inflated dimension in the lateral direction at an area beside the shoulder region PS of the occupant P.

Thus, the second embodiment has the following advantages in addition to the above described advantages (1) to (5).

(6) The upper inflation chamber 73 is divided by the vertical partition 100, which has the communication portions 105, into the upper-rear inflation chamber 74, to which inflation gas is supplied from the inflator 31, and the upper-front inflation chamber 75, to which inflation gas is supplied via the communication portions 105. The upper restricting portions 90 are provided in the upper-rear inflation chamber 74 in a bridging manner (FIGS. 23 and 24).

This increases the amount of energy absorbed by the section of the upper-rear inflation chamber 74 that is inflated beside the rear half of the thorax region PT to improve the protection performance for the rear half of the thorax region PT.

Figure 22:
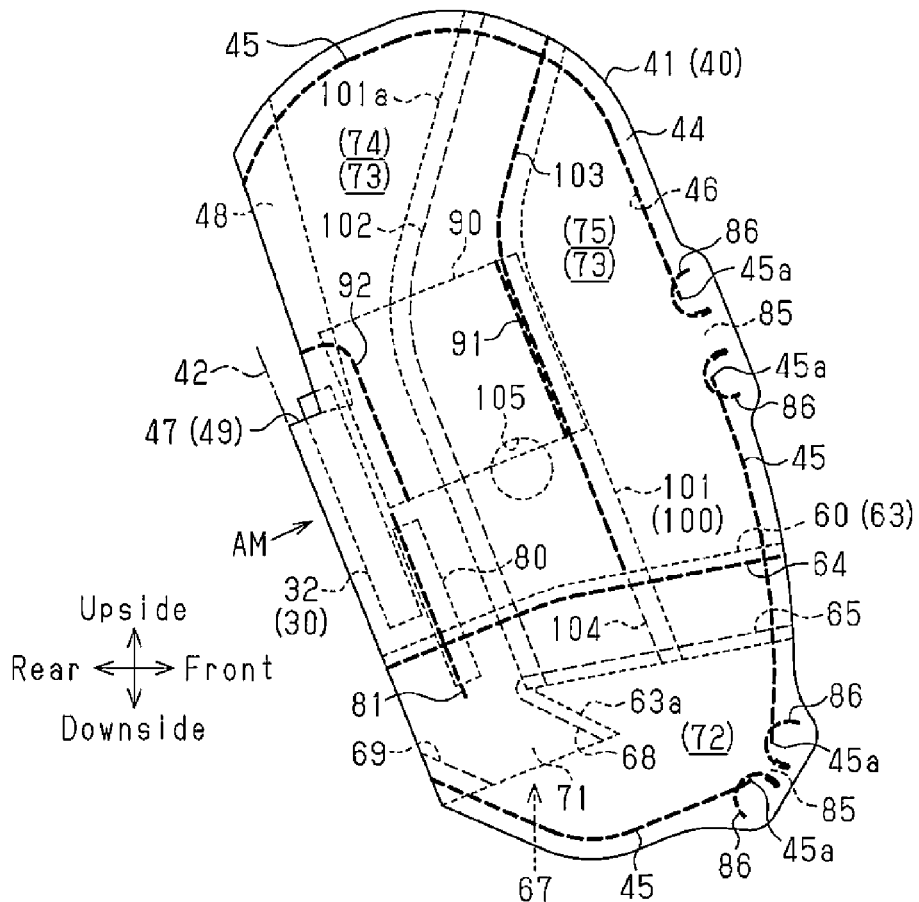
FIG. 22 is a side view showing an automobile side airbag apparatus according to a second embodiment, illustrating an airbag module when an airbag main body is in an uninflated and deployed state.

(7) The upper part of the vertical partition 100 is formed by the inclined portions 101a, which are inclined forward, and the part of the upper-rear inflation chamber 74 that is rearward of the inclined portions 101a is inflated beside the shoulder region PS of the occupant P. In other words, the part of the upper-rear inflation chamber 74 that is rearward of the inclined portions 101a includes a third section, which is inflated beside the shoulder region PS of the occupant P. The upper restricting portions 90 are located at areas in the upper-rear inflation chamber 74 that are below the inclined portions 101a (FIGS. 22 and 24).

This structure allows the upper-rear inflation chamber 74 to be deployed and inflated in a narrow space between the shoulder region PS of the occupant P and the body side portion 11, while improving the protection performance of the upper-rear inflation chamber 74 for the rear half of the thorax region PT.

Third Embodiment

An automobile side airbag apparatus according to a third embodiment will now be described with reference to FIGS. 26 and 27.

In the third embodiment, in addition to the two upper restricting portions 90 in the upper inflation chamber 73, a pair of lower restricting portions 110 is provided in the lower inflation chamber 72. The lower restricting portions 110 restrict the inflated dimension in the front-rear direction of the lower inflation chamber 72, which is inflated beside the lumbar region PP of the occupant P, thereby increasing the inflated dimension in the lateral direction.

Each lower restricting portion 110 is a rectangular fabric piece of the same sheet material as the main body fabric portions 43, 44. The fabric pieces are attached in a bridging manner to sections of the main body fabric portions 43, 44 that form the lower inflation chamber 72.

Figure 26:
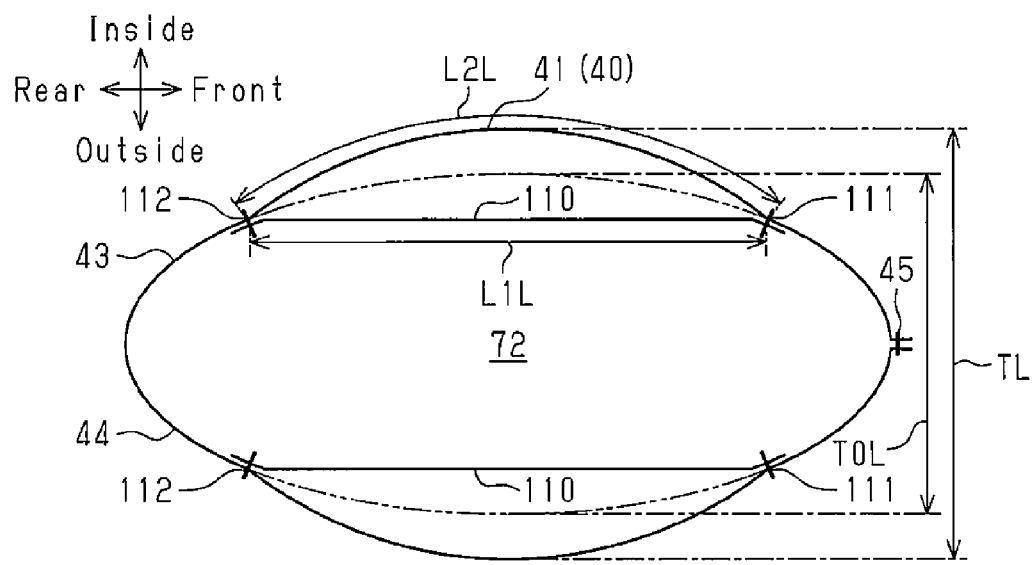
FIG. 26 is a schematic cross-sectional plan view illustrating a state in which the inflated dimension in the front-rear direction of a lower inflation chamber is restricted by lower restricting portions in an automobile side airbag apparatus according to a third embodiment.

As shown in FIG. 26, in each of the main body fabric portions 43, 44, the circumferential length in the front-rear direction of the section to which the lower restricting portions 110 are attached in a bridging manner is defined as a circumferential length L2L, and the length in the front-rear direction of the lower restricting portion 110 is defined as a front-rear length L1L. The lower restricting portions 110 are each formed such that the front-rear length L1L is shorter than the circumferential length L2L.

Figure 27:
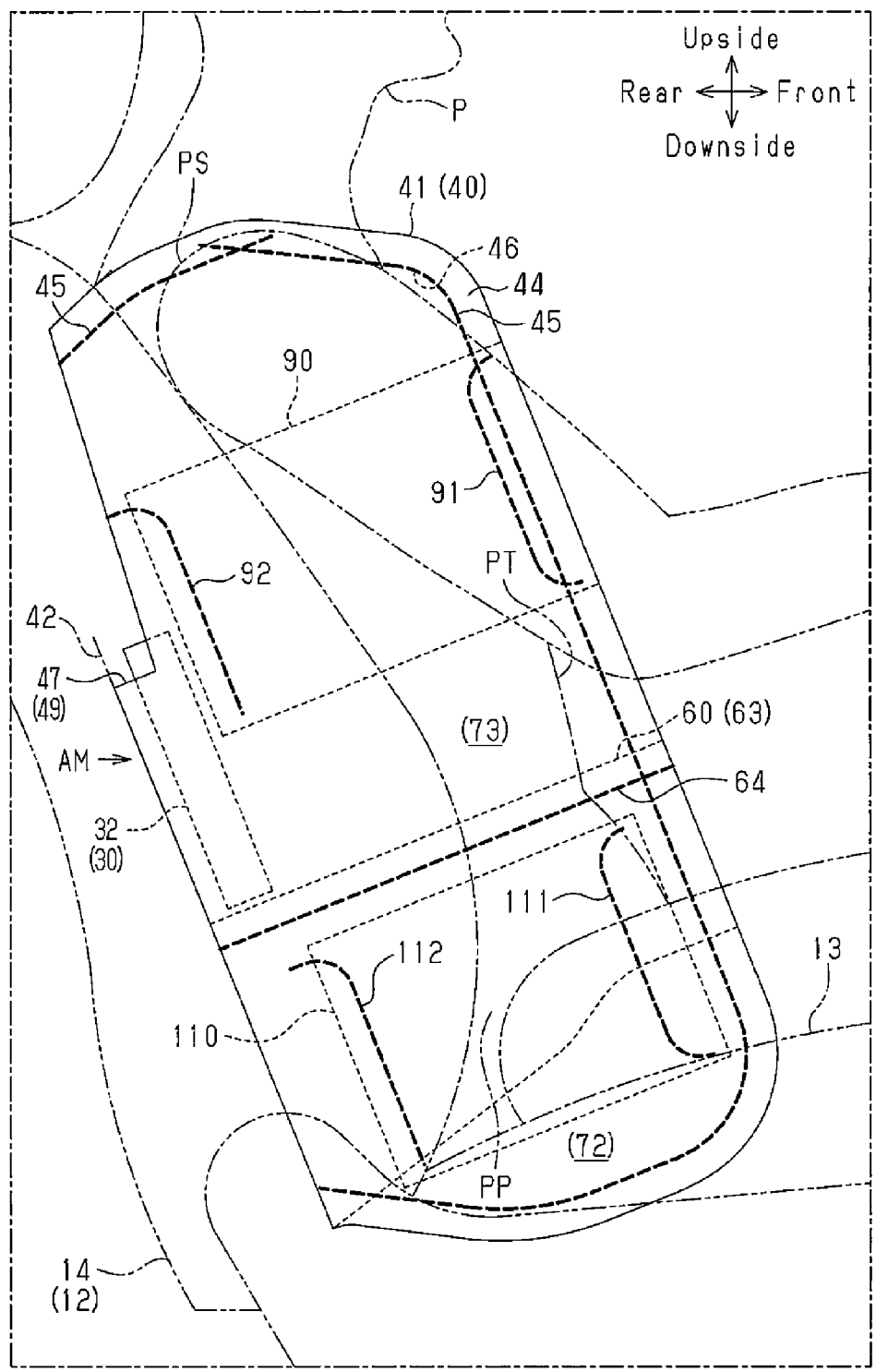
FIG. 27 is a side view illustrating, together with an occupant and an automobile seat, an airbag module in a state in which an airbag main body is in an uninflated and deployed state in the third embodiment.

As shown in FIGS. 26 and 27, the lower restricting portions 110 are located in lower parts of the main body fabric portions 43, 44.

Each lower restricting portion 110 is joined to one of the main body fabric portions 43, 44 with a pair of fourth and fifth vertical joint portions 111, 112. Each fourth vertical joint portion 111 is provided to extend substantially vertically at the front edge of the corresponding lower restricting portion 110 and joins that edge to the front part of the corresponding one of the main body fabric portions 43, 44. Each fifth vertical joint portion 112 is provided to extend substantially vertically at the rear edge of the corresponding lower restricting portion 110 and joins that edge to the rear part of the corresponding one of the main body fabric portions 43, 44. In other words, the rear edges of the lower restricting portions 110 are joined to the main body fabric portions 43, 44, respectively, at sections close to the section of the airbag main body 41 that is fixed to the automobile 10 (the side frame portion 15). In this manner, each lower restricting portion 110 is located in a part of the corresponding one of the main body fabric portions 43, 44 that forms the lower inflation chamber 72 and bridges two sections separated in the front-rear direction. A region of each of the main body fabric portions 43, 44 between the front and rear vertical joint portions 111, 112 is slackened.

As described above, the front-rear length L1L of the lower restricting portions 110 is set to be shorter than the circumferential length L2L of the lower inflation chamber 72. Accordingly, when tensioned due to inflation of the lower inflation chamber 72, the lower restricting portions 110 restrict the inflated dimension in the front-rear direction of the main body fabric portions 43, 44. Accordingly, as shown in FIG. 26, the inflated dimension TL in the lateral direction of the lower inflation chamber 72 at the section where the lower restricting portions 110 are provided is greater than the inflated dimension T0L in a case in which no lower restricting portion 110 is provided.

The increase amount ΔTL of the inflated dimension (ΔTL=TL−T0L) increases as the difference between the circumferential length L2L and the front-rear length L1L increases. In the third embodiment, the difference between the circumferential length L2L and the front-rear length L1L is set such that, when inflation of the airbag main body 41 is completed, the inflated dimension TL of the lower inflation chamber 72 is smaller than the inflated dimension TU of the upper inflation chamber 73 (refer to FIG. 21).

Other than these differences, the third embodiment is the same as the first embodiment. Thus, like or the same reference numerals are given to those components that are like or the same as the corresponding components described above in the first embodiment and detailed explanations are omitted. In FIG. 27, the inner tube 80 and the vent hole 85 are not shown.

In the side airbag apparatus according to the above described third embodiment, inflation of the upper inflation chamber 73 and the lower inflation chamber 72 causes the lateral partition 60 to be pulled toward the opposite sides in the lateral direction. The lateral partition 60 in the tensioned state restricts the inflated dimensions in the lateral direction of the lower inflation chamber 72 and the upper inflation chamber 73.

However, as the lower inflation chamber 72 is deployed and inflated, the lower restricting portions 110 are tensioned in the front-rear direction beside the lumbar region PP of the occupant P. The front-rear length L1L of each lower restricting portion 110 is shorter than the circumferential length L2L in the front-rear direction of the section of the lower inflation chamber 72 to which the lower restricting portions 110 are attached in a bridging manner.

Further, the rear edges of the lower restricting portions 110 are joined to the main body fabric portions 43, 44, respectively, at areas of the airbag main body 41 that are close to areas fixed to the automobile 10 (the side frame portion 15). In contrast, the front edges of the lower restricting portions 110 are joined to the main body fabric portions 43, 44, respectively, at positions that are forward of and away from the fixed sections.

Therefore, the forward deployment and inflation of the lower inflation chamber 72 are restricted by the lower restricting portions 110, which are tensioned in the front-rear direction. This restricts the inflated dimension in the front-rear direction of the lower inflation chamber 72.

In the main body fabric portions 43, 44, the parts that are located between the areas joined to the front edges of the lower restricting portions 110 and the areas that are joined to the rear edges of the lower restricting portions 110 act to be inflated in the lateral direction, in which the inflated dimension is not restricted by the lower restricting portions 110. Thus, when the inflation of the airbag main body 41 is completed, the inflated dimension TL of that section of the lower inflation chamber 72 is greater than the inflated dimension T0L in a case in which no lower restricting portion 110 is provided, while being restricted from being greater than the inflated dimension TU of the upper inflation chamber 73 (refer to FIG. 21).

In the third embodiment, the main body fabric portions 43, 44 each have a lower restricting portion 110. Thus, the inflated dimension TL of a section of the lower inflation chamber 72 to which the lower restricting portions 110 are attached in a bridging manner is increased to the opposite sides in the lateral direction. Therefore, that section of the lower inflation chamber 72 is inflated by a greater amount in the lateral direction than that in a case in which only one of the main body fabric portions 43, 44 has a lower restricting portion 110. This increases the inflated dimension TL of that section of the lower inflation chamber 72. This further increases the amount of energy absorbed by that section of the lower inflation chamber 72.

Thus, the third embodiment has the following advantage in addition to the above described advantages (1) to (5).

(8) The lower inflation chamber 72, which deployed and inflated beside the lumbar region PP of the occupant P, incorporates a pair of sheet-like lower restricting portions 110, which are tensioned in the front-rear direction as the lower inflation chamber 72 is inflated. The front-rear length L1L of each lower restricting portion 110 is set to be shorter than the circumferential length L2L in the front-rear direction of a section of the lower inflation chamber 72 to which the lower restricting portions 110 are attached in a bridging manner (FIGS. 26 and 27).

Thus, a section of the lower inflation chamber 72 to which the lower restricting portions 110 are attached in a bridging manner is largely inflated in the lateral direction. This further increases the amount of energy absorbed by the lower inflation chamber 72 and improves the protection performance for the lumbar region PP.

The above embodiments may be modified as follows.

<Regarding Inflation Portion 46>

The substantially entire airbag main body 41 may be formed of the inflation portion 46 as in the above-illustrated embodiments, but may also partially include a non-inflation portion, which is neither supplied with inflation gas nor inflated.

<Regarding Inner Tube 80>

The shape of the inner tube 80 may be changed as long as the following conditions are satisfied.

Condition 1: The inner tube 80 encompasses at least the gas outlet of the inflator 31.

Condition 2: The inner tube 80 extends substantially vertically and bridges the upper inflation chamber 73 (the upper-rear inflation chamber 74) and the lower inflation chamber 72.

Thus, the inner tube 80 may, for example, encompass the entire inflator 31.

<Regarding Upper Restricting Portions 90 and Lower Restricting Portions 110>

One of the upper restricting portions 90 and/or one of the lower restricting portions 110 may be omitted from the main body fabric portions 43, 44.

In the first and second embodiments, the upper restricting portions 90 may be provided at a section of the upper inflation chamber 73 that is inflated beside a part of the thorax region PT of the occupant P or beside the entire thorax region PT.

<Regarding Storage Portion 18 of Airbag Module AM>

Instead of the seat back 14 of the automobile seat 12, the storage portion 18 may be located in the body side portion 11 to accommodate the airbag module AM.

<Other Modifications>

In the second embodiment, a pressure regulator valve may be provided that adjusts the opening degree of the communication portions 105 to regulate the internal pressures of the upper-rear inflation chamber 74 and the upper-front inflation chamber 75.

In this case, the pressure regulator valve may restrict the flow of inflation gas from the upper-rear inflation chamber 74 to the upper-front inflation chamber 75 either prior to restraint of the occupant P with the upper-rear inflation chamber 74 or at an early stage of supply of inflation gas to the upper-rear inflation chamber 74. The pressure regulator valve may cancel the restriction of the flow in response to the external force applied due to the restraint of the occupant P by the upper-rear inflation chamber 74 or an increase in the internal pressure of the upper-rear inflation chamber 74.

The present invention may be applied to a side airbag apparatus of an automobile in which a seat 12 is arranged such that a seat back 14 faces in a direction other than the forward direction, for example, sideways. In this case, when an impact is applied to a side of the automobile seat 12 (in the front-rear direction of the automobile), the side airbag apparatus protects an occupant P from the impact.

Automobiles to which the side airbag apparatus according to the present invention is applied include various industrial vehicles in addition to private cars.

The present invention can be applied to side airbag apparatuses that are mounted on vehicles other than automobiles, for example, airplanes, boats, and ships and protect occupants seated in vehicle seats from impacts.

The invention claimed is:

1. A side airbag apparatus comprising:
an airbag main body, which is deployed and inflated beside an occupant seated in a vehicle seat to restrain the occupant;
an inflator, which supplies inflation gas to the airbag main body in response to an impact applied to the vehicle seat from a side; and
a lateral partition, which is provided in the airbag main body in a bridging manner to divide at least a part of an interior of the airbag main body into an upper inflation chamber above the lateral partition and a lower inflation chamber below the lateral partition, wherein
the upper inflation chamber includes a first section, and the lower inflation chamber includes a second section,
a sheet-like upper restricting portion is provided in a bridging manner in the first section of the upper inflation chamber, wherein the upper restricting portion restricts an inflated dimension of the upper inflation chamber,
the upper inflation chamber is located above the second section of the lower inflation chamber, and the lower inflation chamber is inflated with an internal pressure higher than that of the upper inflation chamber,
the upper restricting portion has a front-rear length that is shorter than a circumferential length in a front-rear direction of the first section of the upper inflation chamber and is tensioned in the front-rear direction as the upper inflation chamber is inflated, and
the upper restricting portion is configured to restrict an inflated dimension of the upper inflation chamber in the front-rear direction such that, when inflation of the airbag main body is completed, an inflated dimension of the first section of the upper inflation chamber in a widthwise direction of the vehicle seat is greater than an inflated dimension of the lower inflation chamber in the widthwise direction of the vehicle seat.

2. The side airbag apparatus according to claim 1, wherein a greater amount of the inflation gas from the inflator is supplied to the lower inflation chamber than to the upper inflation chamber, and
the lateral partition includes a check valve, which restricts inflation gas that has been supplied from the inflator and flowed into the lower inflation chamber from flowing out to the upper inflation chamber.

3. The side airbag apparatus according to claim 1, wherein
the upper inflation chamber is divided by a vertical partition, which has a communication portion, into an upper-rear inflation chamber and an upper-front inflation chamber,
the upper-rear inflation chamber is located rearward of the vertical partition and is supplied with inflation gas from the inflator,
the upper-front inflation chamber is located forward of the vertical partition and is supplied with inflation gas via the communication portion, and
the upper restricting portion is provided in the upper-rear inflation chamber in a bridging manner.

4. The side airbag apparatus according to claim 3, wherein
an upper part of the vertical partition is constituted by an inclined portion, which is inclined forward,
a part of the upper-rear inflation chamber that is rearward of the inclined portion includes a third section, and
the upper restricting portion is located in an area of the upper-rear inflation chamber that is below the inclined portion.

5. The side airbag apparatus according to claim 1, wherein
the airbag main body is formed by laying two main body fabric portions on each other in the widthwise direction of the vehicle seat and joining peripheral portions of the main body fabric portions to each other,
the upper restricting portion includes a front edge and a rear edge, and
the upper restricting portion is joined to one of the main body fabric portions at the front edge and the rear edge.

6. The side airbag apparatus according to claim 5, wherein
the upper restricting portion is one of a plurality of upper restricting portions, and
one of the upper restricting portions is provided on each main body fabric portion.

7. The side airbag apparatus according to claim 5, wherein
the airbag main body is fixed to the vehicle at a rear end of the airbag main body, and
the rear edge of the upper restricting portion is joined to one of the main body fabric portions at an area that is close to an area of the airbag main body that is fixed to the vehicle.

8. The side airbag apparatus according to claim 1, wherein
a sheet-like lower restricting portion is provided in the lower inflation chamber in a bridging manner, wherein
the lower restricting portion is tensioned in the front-rear direction as the lower inflation chamber is inflated, and
the lower restricting portion has a front-rear length that is shorter than a circumferential length in the front-rear direction of a section of the lower inflation chamber at which the lower restricting portion is provided in a bridging manner.

* * * * *